(12) United States Patent
Wada et al.

(10) Patent No.: US 6,919,996 B2
(45) Date of Patent: Jul. 19, 2005

(54) OBJECTIVE LENS FOR USE IN OPTICAL PICKUP APPARATUS AND OPTICAL PICKUP APPARATUS

(75) Inventors: Kazuhiro Wada, Hachioji (JP); Hiroyuki Hattori, Hachioji (JP); Yayoi Eguro, Hachioji (JP); Norikazu Arai, Komae (JP); Koji Honda, Kodaira (JP); Yuichi Honda, Hachioji (JP); Yuichi Atarashi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/642,199

(22) Filed: Aug. 18, 2003

(65) Prior Publication Data

US 2004/0032671 A1 Feb. 19, 2004

Related U.S. Application Data

(63) Continuation-in-part of application No. 10/050,560, filed on Jan. 18, 2002, now abandoned.

(30) Foreign Application Priority Data

Jan. 24, 2001 (JP) ........................................ 2001-015799
Mar. 13, 2001 (JP) ........................................ 2001-070021
Aug. 31, 2001 (JP) ........................................ 2001-263998

(51) Int. Cl.$^7$ .............................. G02B 3/02; G11B 7/00
(52) U.S. Cl. ........................ 359/719; 359/717; 359/819; 369/112.24
(58) Field of Search ................................ 359/507, 509, 359/719, 717, 741, 811, 813, 817–819, 646, 661, 691, 692; 369/112.23, 112.24

(56) References Cited

U.S. PATENT DOCUMENTS

| 5,166,830 | A | 11/1992 | Ishibai et al. ................ 359/717 |
| 5,896,234 | A | 4/1999 | Miyamoto et al. .......... 359/819 |
| 6,462,895 | B2 * | 10/2002 | Hunter ........................ 359/819 |
| 6,574,056 | B2 * | 6/2003 | Ishikawa et al. ............. 359/823 |
| 6,744,568 | B2 * | 6/2004 | Kitamura et al. ............ 359/719 |
| 2002/0005996 | A1 | 1/2002 | Kitamura et al. ............ 359/819 |
| 2002/0039341 | A1 * | 4/2002 | Kikuchi et al. ........ 369/112.23 |
| 2002/0135891 | A1 * | 9/2002 | Kimura et al. .............. 359/795 |

* cited by examiner

*Primary Examiner*—Georgia Epps
*Assistant Examiner*—M. Hasan
(74) *Attorney, Agent, or Firm*—Finnegan, Henderson, Farabow, Garrett & Dunner, L.L.P.

(57) ABSTRACT

An objective lens for use in an optical pickup apparatus, comprises a first lens molded with a plastic and having an optically functional section, flange section provided around the periphery of the optically functional section, and a first contacting section provided on the flange section; and a second lens molded with a plastic, located opposite to the first lens and having an optically functional section, a flange section provided around the periphery of the optically functional section, and a second contacting section provided on the flange section. The first lens and the second lens are joined in such a way that the first contacting section and the second contacting section are brought in contact with each other.

54 Claims, 21 Drawing Sheets

OBJECTIVE LENS FOR USE IN OPTICAL PICKUP APPARATUS AND OPTICAL PICKUP APPARATUS

This application is a continuation-in-part application of U.S. patent application Ser. No. 10/050,560, filed on Jan. 18, 2002, now abandoned.

BACKGROUND OF THE INVENTION

The present invention relates to an optical pick-up objective lens which is used for an optical pick-up that performs information recording or reproduction for an optical information recording medium representing an optical disk, and to an optical pick-up wherein the optical pick-up objective lens is used.

In particular, the present invention relates to an optical unit and an optical apparatus, and in more particular, to an optical unit in which a first optical element and a second optical element are unitized in one body and to an optical apparatus having this optical unit.

In the past, a plastic-molded single lens has been used mainly for an optical pick-up objective lens. A large number of the plastic-molded single lenses are used for an optical pick-up for recording or reproduction for not only CD but also MO and DVD. For DVD use or CD and DVD common use for the plastic-molded objective lens, comparing with CD use, it is requested to obtain a higher numerical aperture and a higher accuracy, and further, for the plastic-molded single lens for an advanced optical information recording medium to record or reproduce for information which is higher than DVD in density, comparing to DVD, it is considered to be requested to obtain a higher numerical aperture and higher performance having a higher accuracy, and the present condition is that the proposals for the requests are starting.

On the other hand, a glass-molded single lens has also been used partly, however, as compared with the glass lens, the specific gravity of the plastic lens is so low that a load to an actuator for driving the objective lens may be reduced, and the objective lens can be driven so quickly that the plastic lens is much more advantageous than the glass lens. Due to this, in the past, attention has been paid mainly to research and development of the plastic-molded single objective lens having desired performance, and technical development has been carried out for lens form satisfying the necessary performance and the manufacturing technology. Even on the present days, the research and development do not stop, and there is no standstill for the technical development for the higher precision and the higher performance of the midget and thin plastic-molded single objective lens having a very small diameter.

By the precise production of a metal mold having a desired form, it is possible to produce easily a great number of the plastic-molded lenses which are made of plastic materials by using a metal mold, due to this, it is preferable that the plastic-molded lens contributes generally to the higher performance and the lower cost of the lens.

However, there is a problem that the attainment of the high numerical aperture of the objective lens for the optical pick-up by using the plastic-molded single lens is very difficult, because the lens performance is affected greatly by shifts of both optical surfaces, further, when using short wavelength light, such as blue purple laser having the wave length of about 400 nm for the light source, the influence is greater remarkably, resulting in a higher technical difficulty in metal mold manufacturing and molding. Further, there is a problem that the plastic-molded single lens finally produced by using the high technology is expensive necessarily.

With the background stated above, the first object of the invention is to provide an objective lens for an optical pick-up in which a high numerical aperture can easily be realized, while a plastic-molded lens is used, high precision and high performance are secured, and a low cost is realized under easy manufacturing, and to provide an optical pick-up having the above-mentioned objective lens for optical pick-up.

Incidentally, there has been an optical unit wherein a first optical element in which an effective optical surface is formed and a second optical element in which an effective optical surface is formed are unitized integrally. In this optical unit, in the case that a space which is surrounded by the first optical element and the second optical element is sealed hermetically, when there are changes in ambient temperature and humidity for this optical unit, it causes an external pressure on the first optical element and the second optical element to lower the surface accuracy of the effective optical surface, due to expansion or contraction of air existing in the space, and when an ambient temperature goes down, moisture existing in this space is saturated and condenses on the effective optical surface of the space, affecting an optical character.

In the recent years, there is a high demand for an optical element that is highly accurate and inexpensive and is used for an optical disk. For example, when an objective lens for an optical disk has a space, a deterioration of a surface accuracy of the effective optical surface and condensation mentioned above cannot be ignored, resulting in a problem.

The present invention has been done in view of the above-mentioned problems, and a second object of the invention is to provide an optical unit in which a deterioration of surface accuracy and the condensation on an effective optical surface are hardly caused, even if there exists a space which is surrounded with a first optical element and a second optical element.

Further, the object is to provide an optical unit in which a decline of surface accuracy and dew condensation on an effective optical surface are hardly caused, even if there exists a space which is surrounded with a first optical element, a second optical element and a intermediate holding member.

Still further, the object is to provide an optical device in which a deterioration of surface accuracy or and the condensation on an effective optical surface are hardly caused, even if the above-mentioned optical unit is integrated.

As stated above, when constituting one optical unit by combining two or more optical elements as stated above, it is necessary to combine them accurately.

For example, in the case of an objective lens for an optical pickup, there is an occasion wherein capacity is not attained not by shift of an optical axis but by occurrence of a tilt. In recent years, in particular, an objective lens is required to have high accuracy, because of a tendency of high density, thus, it is necessary to combine single lenses (or optical elements) with less tilt and less shift of an optical axis.

In this optical unit, a clearance surrounded by a first optical element and a second optical element is made airtight, and when this clearance is made airtight, if ambient temperature and humidity for the optical unit are changed, air representing a gas existing in the clearance is expanded or compressed, and thereby, external pressure is applied on the first optical element and the second optical element, resulting in occurrence of deterioration of surface accuracy of an optical functional surface, and when ambient temperature used is lowered, moisture contained in the clearance turns out to be in the state of saturation, resulting in dew condensation which affects optical power.

In recent years, there has been an increasing demand for an optical element for an optical disc which is highly accurate and inexpensive. For example, when there is a clearance in an objective lens for optical disc, a fall of surface accuracy on an optical functional surface and dew condensation have been problems which cannot be ignored. Namely, it is a problem that a change of ambient temperature makes moisture in a clearance between optical elements to be condensed into a dewdrop which sticks to the surface of an optical functional surface, and when this dew condensation is caused, optical function cannot be attained.

The invention has been achieved in view of the problem mentioned above, and its third object is to provide an optical unit wherein air permeability for the clearance between optical functional surfaces of optical elements is secured and deterioration of surface accuracy of an optical functional surface and dew condensation are hardly caused, and to provide an optical apparatus wherein deterioration of surface accuracy of an optical functional surface and dew condensation are hardly caused even when an optical unit is incorporated.

SUMMARY OF THE INVENTION

The first object can be attained by either one of the Structures shown below.

The invention described in the Structure (1—1) is an objective lens for an optical pick-up including at least two or more plastic-molded lenses, wherein a first touching section is provided on a part which is outside an optical functional section of a first lens, a second touching section is provided on a part which is outside a functional section of a second lens arranged to face the first lens, and the first touching section of the first lens and the second touching section of the second lens are structured to be in contact each other.

The invention described in the Structure (1-2) is an objective lens for an optical pick-up including at least two or more plastic-molded lenses, wherein a part which is outside an optical functional section of the second lens is structured to be held by a part which is outside an optical functional section of the first lens.

The invention described in the Structure (1-3) is the objective lens for the optical pick-up described in the Structure (2), wherein the first touching section is provided on a part which is outside the optical functional section of the first lens, the second touching section is provided on a part which is outside the optical functional section of the second lens, and the first touching section and the second touching section are structured to be in contact each other.

The invention described in the Structure (1-4) is an objective lens for an optical pick-up including two plastic-molded lenses, wherein when assuming that the first lens and the second lens are arranged in this order from an object side (from a light source side in the optical pick-up), and optical surfaces, representing first surface, second surface, third surface and fourth surface, are arranged in this order from the object side, the first surface and the third surface are structured to be convex, a first touching section projecting from the second surface in a direction of an optical axis is provided on a part which is outside the optical functional section of the first lens, a second touching section which is projecting toward the object side in a direction of the optical axis and being a cut form is provided on a part which is outside the optical functional section of the second lens, and the first touching section is brought into contact with the second touching section so that the second lens may be held by the first lens.

The invention described in the Structure (5) is the objective lens for the optical pick-up described in the Structure (1-4), wherein a circumferential diameter of the second lens is smaller than that of the first lens.

The invention described in the Structure (1-6) is the objective lens for the optical pick-up described in the Structure (1-4) or Structure (1-5), wherein the fourth surface is a flat surface.

The invention described in the Structure (1-7) is the objective lens for the optical pick-up described in at least either one Structure of the Structures (1-4)–(1-6), wherein a concave section recessed toward the object side from the position on the fourth surface closest to the image is provided on a part outside the optical functional section of the fourth surface side of the second lens.

The invention described in the Structure (1-8) is the objective lens for the optical pick-up described in either one Structure of the Structures (1—1), and the Structures (1-3)–(1-7), wherein a relative positioning of the first lens and the second lens in the direction of the optical axis is carried out when the first touching section is brought into contact with the second touching section.

The invention described in the Structure (1-9) is the objective lens for the optical pick-up described in the Structure (1-8), Wherein the first touching section provided with a first vertical surface that is perpendicular to the optical axis, the second touching section is provided with a second vertical surface that is perpendicular to the optical axis, and a relative positioning of the first lens and the second lens in the direction of the optical axis is carried out when the first vertical section is brought into contact with the second vertical section.

The invention described in the Structure (1-10) is the objective lens for the optical pick-up described in either one of the Structure (1—1), and the Structures (1-3)–(1-7), wherein the relative positioning of the first lens and the second lens in the direction of the optical axis is carried out when the first touching section is brought into contact with the second touching section.

The invention described in the Structure (1-11) is the objective lens for the optical pick-up described in the Structure (1-10), wherein a first touching section is provided with a first parallel surface in the direction of the optical axis, a second touching section is provided with a second parallel surface in the direction of the optical axis, a relative positioning of the first lens and the second lens that is perpendicular to the optical axis is carried out when the first parallel surface is brought into contact with the second parallel surface.

The invention described in the Structure (1-12) is the objective lens for the optical pick-up described in either one of the Structure (1—1), and Structures (1-3)–(1-7), wherein the relative positioning of the first lens and the second lens, in the direction of the optical axis, and in the direction perpendicular to the optical axis, is carried out when the first touching section is brought into contact with the second touching section.

The invention described in the Structure (1-13) is the objective lens for the optical pick-up described in the Structure (1-12), wherein the first touching section is provided with the first vertical surface which is perpendicular to the optical axis and the first parallel surface which is in the optical axis direction, the second touching section is provided with the second vertical surface which is perpendicular to the optical axis and the second parallel surface which is in the optical axis direction, the relative positioning of the first lens and the second lens, in the direction of the optical axis, is carried out when the first vertical surface touches the second vertical surface, And the relative positioning of the first lens and the second lens, in the direction that is perpendicular to the optical axis, is carried out when the first parallel surface touches the second parallel surface.

The invention described in the Structure (1-14) is the objective lens for the optical pick-up described in either one of the Structures (1—1)–(1-13), wherein the first lens is engaged with the second lens on an interference fit basis when the first touching section touches the second touching section.

The invention described in the Structure (1-15) is the objective lens for the optical pick-up described in either one of the Structures (1—1)–(1-13), wherein the first lens is engaged with the second lens on a clearance fit basis when the first touching section touches the second touching section.

The invention described in the Structure (1-16) is the objective lens for the optical pick-up described in either one of the Structures (1—1)–(1-15), wherein the first lens is cemented with the second lens after being engaged with each other when the first touching section touches the second touching section.

The invention described in the Structure (1-17) is the objective lens for the optical pick-up described in either one of the Structures (1—1)–(1-16), wherein the optical functional section of the first lens is not in contact with, but is away from, the optical functional section of the second lens.

The invention described in the Structure (1-18) is the objective lens for the optical pick-up described in either one of the Structures (1—1)–(1-17), wherein a diameter of the optical surface for the image side is made to be 40% or less of an outside diameter of the plastic-molded lens located to be closest to the image side (the opposite side of the light source on the optical pick-up).

The invention described in the Structure (1-19) is the objective lens for the optical pick-up described in either one of the Structures (1—1)–(1-18), wherein the first touching section and the second touching section are provided circularly on the peripheral areas which are outside the optical functional sections of each lens.

The invention described in the Structure (1-20) is the objective lens for the optical pick-up, described in either one of the Structures (1—1)–(1-19), wherein a first image-side flat surface that is in the direction perpendicular to the optical axis is provided outside the first touching section to be closer to the image side, and a second image-side flat surface that is in the direction perpendicular to the optical axis is provided outside the optical functional section of the second lens to be closer to the image side.

The invention described in the Structure (1-21) is the objective lens for the optical pick-up described in the Structure (1-20), wherein the first image-side flat surface and the second image-side flat surface are mirror planes.

The invention described in the Structure (1-22) is the optical pick-up, wherein the objective lens for the optical pick-up described in either one of the Structures (1—1)–(1-21) is used.

The invention described in the Structure (1-23) is the optical pick-up described in the Structure (1-22), wherein the invention is designed to be not more than the Marechal's criterion.

The invention described in the Structure (1-24) is the optical pick-up, wherein, under the condition that the relative positioning of the first lens and the second lens in the optical direction has been carried out when the first touching section comes into contact with the second touching section in the objective lens for the optical pick-up described in either one of the Structures from (1—1) to (1-7), when the second lens is moved against the first lens, in the direction perpendicular to the optical axis in a fitting clearance between the first lens and the second lens, a changing value of a wave front aberration at the image forming position is not more than a diffraction limit power.

The invention described in the Structure (1-25) is the optical pick-up, wherein the objective lens for the optical pick-up described in either one of the Structures (1—1)–(1-21) is used so that the first lens may be held by a lens barrel which is driven by an actuator.

The invention described in the Structure (1-26) is the optical pick-up described in either one of the Structures (1-22)–(1-24), wherein the first lens is held by the lens barrel which is driven by the actuator.

When the plastic-molded single lens is used, for the request of a higher aperture number of the objective lens for the optical pick-up, a curvature of an optical surface becomes greater, lens performance is more affected by the shifts of both optical surfaces, production of the metal mold for molding work and assembling accuracy become very severe, and maintenance of the product quality becomes very severe, which is a problem. However, the structure mentioned above eliminates the problem, and makes it possible to mold individually a plurality of the plastic-molded lenses each having a relatively small aperture and to combine them and obtain the plastic-molded lenses which can answer the requirement of the higher numerical aperture. Due to this, the productivity of the metal mold is so excellent that the lens performance can be transferred from the metal mold precisely, and the high performance lens can be easily produced. Further, since at least two plastic-molded lenses are made to be in contact with each other, or one of those lenses is held by the other lens, to constitute the objective lens for the optical pick-up, the higher precision and the high performance are easily realized, and it is easy to answer the requirement for the higher numerical aperture or the miniaturization of the objective lens for the optical pick-up, compared with an occasion where each lens is positioned and fixed respectively on the lens barrel. Further, it is easy to constitute so that aberration and errors such as astigmatism owned by each lens can correct each other, because the invention uses a plurality of the plastic-molded lenses.

Further, the second object of the above-mentioned first invention is attained by the following means.

(2-1) An optical unit having therein a first optical element having an effective optical surface and a second optical element having an effective optical surface, both unitized integrally, wherein there are provided at least a space surrounded with the effective optical surface of the first optical element and the effective optical surface of the second optical element, and a air duct through which air passes between the space and the open air.

The object of the above-mentioned second invention is attained by the following means.

(2—2) An optical unit having therein a first optical element having an effective optical surface, a second optical element having an effective optical surface, and an intermediate holding member holding the first optical element and the second optical element, the first optical element and the second optical element being unitized integrally through the intermediate holding member, wherein there are provided at least a space surrounded with the effective optical surface of the first optical element, the effective optical surface of the second optical element, and the intermediate holding member, and a air duct through which air passes between the space and the open air.

The object of the above-mentioned third invention is attained by the following means.

(2-3) An optical device wherein there are provided the optical unit mentioned in (2-1) or (2—2), and a holding member which holds the optical unit without blocking the air duct formed on the optical unit.

To attain the third object stated above, the invention is structured as follows.

The invention described in Structure (3-1) is an optical unit having therein a plurality of optical elements each having a flange section which are combined so that a clearance may be provided between optical functional surfaces of the optical elements, wherein the whole circumference of the flange section fits with that of another flange section, and adhesive agents are applied on prescribed portions on the fitting section, while some areas where no adhesive agents are applied are provided on the fitting section.

In the invention described in Structure (3-1), adhesive agents are applied on prescribed portions of the fitting section of the flange section, and optical elements can be combined accurately, and air permeability in the clearance formed between optical functional surfaces of the optical elements can be secured because the clearance formed between the optical functional surfaces of the optical elements is made not to be airtight by the area where no adhesive agents are applied, and when ambient temperature and humidity used are changed, the optical element can be free from external pressure and surface accuracy on the optical functional surface can be maintained, although air representing a gas existing in the clearance is expanded or compressed. Further, since the clearance is made not to be airtight by the area where no adhesive agents are applied among the fitting section, it is prevented that vapor is condensed into a dewdrop in the clearance between optical functional surfaces of optical elements and sticks on the surface of the optical functional surface on the clearance side, even when ambient temperature is changed.

The invention described in Structure (3-2) is the optical unit according to Structure (3-1), wherein the area where no adhesive agents are applied serves as an air flow path.

In the invention described in Structure (3-2), even when ambient temperature is changed, it is prevented more firmly that vapor is condensed into a dewdrop in the clearance between optical functional surfaces of optical elements and sticks on the surface of the optical functional surface closer to the clearance, because the area where no adhesive agents are applied serves as an air flow path, and air flows through the clearance between optical functional surfaces of optical elements.

The invention described in Structure (3—3) is the optical unit according to Structure (3-1) or Structure (3-2), wherein the number of areas where adhesive agents are applied is two or more.

In the invention described in Structure (3—3), optical elements are cemented with each other firmly by two or more areas where adhesive agents are applied, tilt is slight, an optical axis is shifted less and optical elements can be combined highly accurately.

The invention described in Structure (3-4) is the optical unit according to either one of Structures (3-1)–(3—3), wherein the areas where adhesive agents are applied are provided at almost regular intervals on the flange section.

In the invention described in Structure (3-4), the areas where adhesive agents are applied are provided at almost regular intervals on the flange section, and thereby, optical elements are cemented to each other firmly and evenly, and optical elements can be combined highly accurately with less tilt and less shift of an optical axis.

The invention described in Structure (3-5) is the optical unit according to either one of Structures (3-1)–(3-4), wherein the water vapor transmission ratio of the hardened adhesive agent is 10 g/m$^2$·24 h–60 g/m$^2$·24 h.

In the invention described in Structure (3-5), the water vapor transmission ratio of the hardened adhesive agent is 10 g/m$^2$·24 h–60 g/m$^2$·24 h, and vapor generated in the clearance between optical functional surfaces of optical elements is transmitted through adhesive agents to leaks to the outside, and therefore, it is possible to prevent that vapor generated in the clearance between optical functional surfaces of optical elements is condensed into a dewdrop.

The invention described in Structure (3-6) is the optical unit according to either one of Structures (3-1)–(3-4), wherein the water absorption rate of the hardened adhesive agent is 0.1%–10%.

In the invention described in Structure (3-6), the water absorption rate of the hardened adhesive agent is 0.1%–10%, and vapor generated in the clearance between optical functional surfaces of optical elements is absorbed in adhesive agents, and therefore, it is possible to prevent that vapor generated in the clearance between optical functional surfaces of optical elements is condensed into a dewdrop.

The invention described in Structure (3-7) is the optical unit according to either one of Structures (3-1)–(3-4), wherein the adhesive strength of the hardened adhesive agent is 40 Kgf/cm$^2$–300 Kgf/cm$^2$.

In the invention described in Structure (3-7), the adhesive strength of the hardened adhesive agent is 40 Kgf/cm$^2$–300 Kgf/cm$^2$, and thereby, optical elements can be cemented to each other firmly and they can be combined highly accurately with less tilt and less shift of an optical axis.

The invention described in Structure (3-8) is an optical unit having therein a plurality of optical elements each having a flange section which are combined so that a clearance may be provided between optical functional surfaces of the optical elements, wherein the whole circumference of the flange section fits with that of another flange section so that the fitting sections may be in close contact each other, and water vapor transmission ratio of the optical element is 1 g/m$^2$·24 h–40 g/m$^2$·24 h.

In the invention described in Structure (3-8), the optical elements can be combined highly accurately, and water vapor transmission ratio of the optical element is 1 g/m$^2$·24 h–40 g/m$^2$·24 h, and vapor generated in the clearance between optical functional surfaces of optical elements is transmitted through the optical element to leaks to the outside, thus, it is possible to prevent that vapor generated in the clearance between optical functional surfaces of optical elements is condensed into a dewdrop.

The invention described in Structure (3-9) is an optical unit having therein a plurality of optical elements each having a flange section which are combined so that a clearance may be provided between optical functional surfaces of the optical elements, wherein the whole circumference of the flange section fits with that of another flange section so that the fitting sections may be in close contact each other, and coefficient of water absorption of the optical element is 0.01%–2%.

In the invention described in Structure (3-9), the optical elements can be combined highly accurately, and coefficient of water absorption of the optical element is 0.01%–2%, and vapor generated in the clearance between optical functional surfaces of optical elements is absorbed in the optical element, thus, it is possible to prevent that vapor generated in the clearance between optical functional surfaces of optical elements is condensed into a dewdrop.

The invention described in Structure (3-10) is an optical unit having therein a plurality of optical elements each having a flange section which are combined so that a clearance may be provided between optical functional surfaces of the optical elements, wherein the whole circumference of the flange section fits with that of another flange section, and adhesive agents are applied on the prescribed portions on the fitting section, while, areas where no adhesive agents are applied are provided on the fitting section, and water vapor transmission ratio of the optical element is 1 g/m²·24 h–40 g/m²·24 h.

In the invention described in Structure (3-10), adhesive agents are applied on prescribed portions on the fitting section for flanges and thereby optical elements can be combined together highly accurately, and vapor generated in the clearance between optical functional surfaces of the optical elements can leak to the outside through the area where no adhesive agents are applied on the fitting section, and water vapor transmission ratio of the optical element is 1 g/m²·24 h–40 g/m²·24 h, and vapor is transmitted through the optical element and leaks to the outside, thus, it is possible to prevent that vapor is condensed into a dewdrop.

The invention described in Structure (3-11) is an optical unit having therein a plurality of optical elements each having a flange section which are combined so that a clearance may be provided between optical functional surfaces of the optical elements, wherein the whole circumference of the flange section fits with that of another flange section, and adhesive agents are applied on the prescribed portions on the fitting section, while, areas where no adhesive agents are applied are provided on the fitting section, and coefficient of water absorption of the optical element is 0.01%–2%.

In the invention described in Structure (3-11), adhesive agents are applied on prescribed portions on the fitting section for flanges and thereby optical elements can be combined together highly accurately, and vapor generated in the clearance between optical functional surfaces of the optical elements can leak to the outside through the area where no adhesive agents are applied on the fitting section, and coefficient of water absorption of the optical element is 0.01%–2%, and vapor generated in the clearance between optical functional surfaces of the optical elements is absorbed in the optical element, thus, it is possible to prevent that vapor generated in the clearance between optical functional surfaces of the optical elements is condensed into a dewdrop.

The invention described in Structure (3-12) is an optical unit having therein a plurality of optical elements each having a flange section which are combined so that a clearance may be provided between optical functional surfaces of the optical elements, wherein the whole circumference of the flange section fits with that of another flange section, and adhesive agents are applied on almost all circumference of the fitting section, and water vapor transmission ratio of the hardened adhesive agent is 10 g/M²·24 h–60 g/m²·24 h.

In the invention described in Structure (3-12), water vapor transmission ratio of the hardened adhesive agent applied on almost all circumference of the fitting section is 10 g/m²·24 h–60 g/m²·24 h, and vapor generated in the clearance between optical functional surfaces of the optical elements is transmitted through the adhesive agents and leaks to the outside, thus, it is possible to prevent that vapor is condensed into a dewdrop.

The invention described in Structure (3-13) is an optical unit having therein a plurality of optical elements each having a flange section which are combined so that a clearance may be provided between optical functional surfaces of the optical elements, wherein the whole circumference of the flange section fits with that of another flange section, and adhesive agents are applied on almost all circumference of the fitting section, and coefficient of water absorption of the hardened adhesive agent is 0.1%–10%.

In the invention described in Structure (3-13), coefficient of water absorption of the hardened adhesive agent applied on almost all circumference of the fitting section is 0.1%–10%, and vapor generated in the clearance between optical functional surfaces of the optical elements is absorbed in the adhesive agents, thus, it is possible to prevent that vapor generated in the clearance between optical functional surfaces of the optical elements is condensed into a dewdrop.

The invention described in Structure (3-14) is an optical apparatus wherein a holding member that holds the optical unit described in either one of Structures (3-1)–(3-13) is provided.

In the invention described in Structure (3-14), deterioration of surface accuracy of an optical functional surface and dew condensation are hardly caused even when an optical unit is incorporated in an optical apparatus.

DETAILED DESCRIPTION OF THE PREFERRED EMBODIMENT

Figure 1:
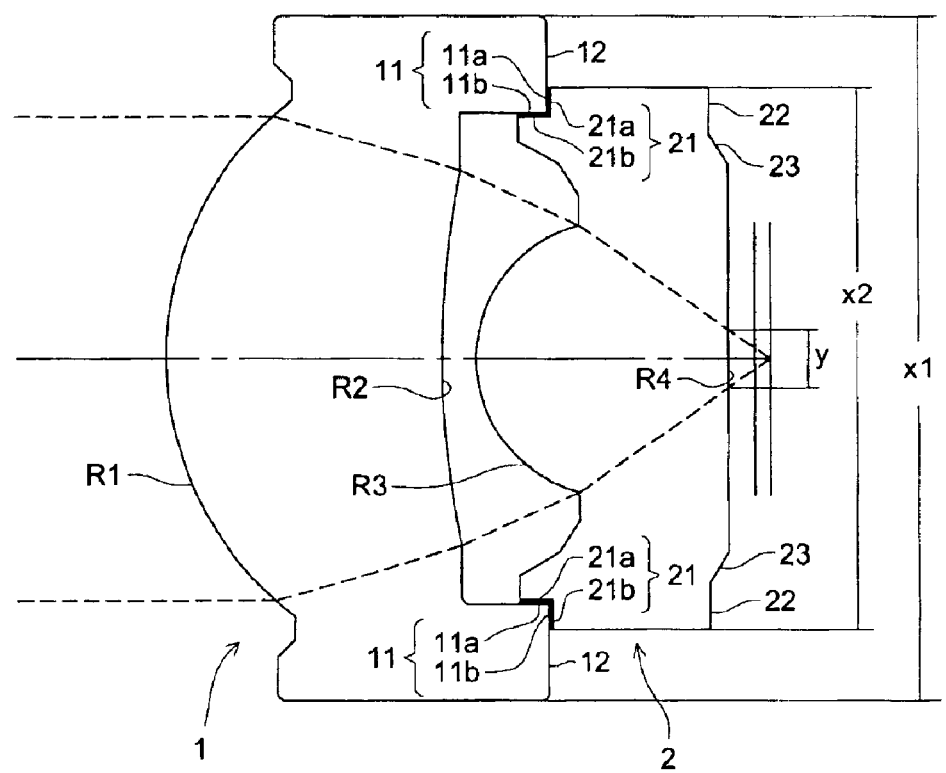
FIG. 1 is a sectional view showing a first embodiment of an objective lens for an optical pick-up of the invention.

Referring to the drawings, the embodiments of the objective lens for the optical pick-up and the optical pick-up employing the objective lens for the optical pick-up of the invention to achieve the first object are explained as follows.

(The Embodiment of 1—1)

Figure 2:
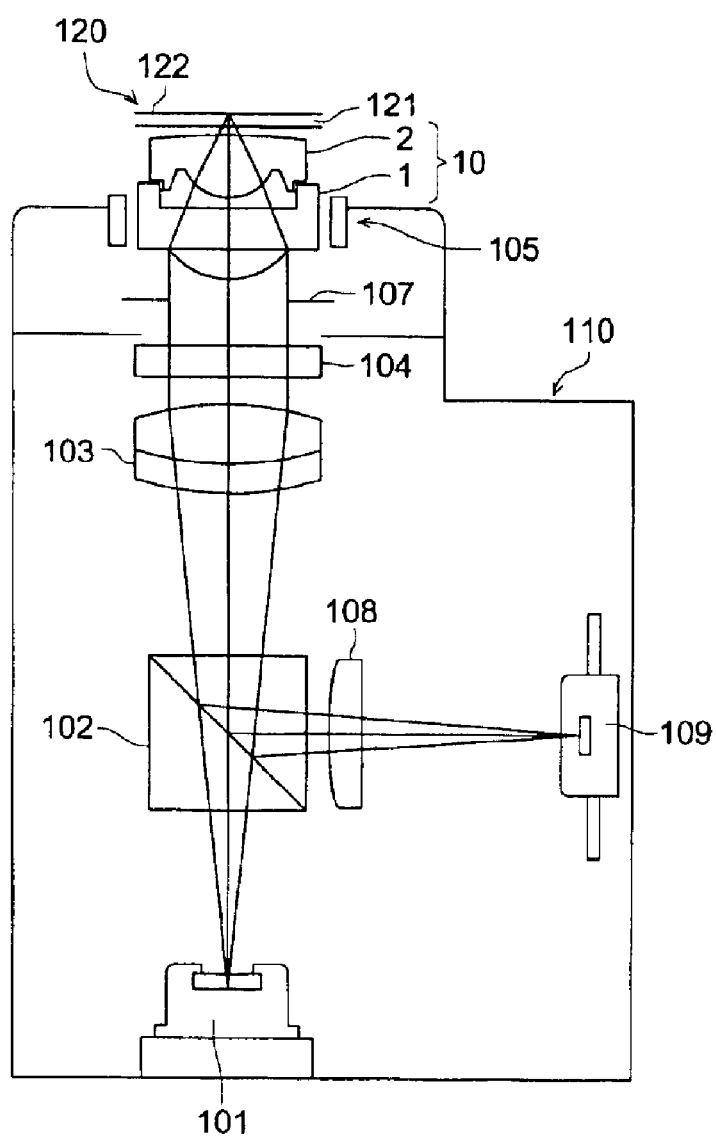
FIG. 2 is a schematic structural drawing showing an embodiment of an optical pick-up of the invention wherein the objective lens for the optical pick-up shown in FIG. 1 is applied.

FIG. 1 is a sectional view of an objective lens for an optical pick-up, and FIG. 2 is a schematic structural drawing of an optical pick-up wherein the objective lens for the optical pick-up shown in FIG. 1 is incorporated. An example of the objective lens which is structured by two plastic-molded lenses is shown in this embodiment.

In FIG. 1, objective lens 10 for an optical pick-up is composed of object side lens 1 arranged at a light source side of the optical pick-up, and image side lens 2 arranged at the opposite side of the light source of the optical pick-up, which faces an optical information recording medium, when recording information on the optical information recording medium such as the optical disk, or reproducing. Though an illustration is omitted, each of these lenses 1 and 2 has an outer circumferential form that is nearly circular, and has a nearly circular optical functional section around the optical axis, when they are viewed in the direction of the optical axis. Lenses 1 and 2 are made of plastic (that is, resin), and are the plastic-molded lenses which are molded by the metal molds formed in the prescribed shapes respectively, and in the present embodiment, the lens is produced by the injection molding in which resin is injected in the metal mold so that the shape of the metal mold may be transferred.

In FIG. 1, a one-dot chain line shows an optical axis of objective lens 10 for the optical pick-up, and dotted lines show rays which are farthest from the optical axis among the light fluxes, which are made to pass through objective lens 10 for the optical pick-up by a means that regulates an opening such as an aperture provided separately on the lens barrel (that is, bobbin) holding the objective lens or provided on the optical pick-up. Accordingly, in FIG. 1, a portion that is inside the dotted lines (that is, closer to an optical axis) in lens 1 and lens 2 is the optical functional section used actually. However, for the production of the lens, it is general that the optical functional section is made to be larger than the section used actually to have room, and therefore, the area to be used actually as the optical surface is slightly larger than the area surrounded by these dotted lines, in the embodiment.

In lenses 1 and 2 of the embodiment, each of the parts which are outside the optical functional sections is made to be of a flange form as shown in FIG. 1. In lens 1, a projecting section projecting toward the lens 2 is provided on the flange section being outside the optical functional section, and touching section 11 is provided on the optical axis side of the projecting section. Touching section 11 is provided with vertical surface 11a which is perpendicular to the optical axis of lens 1, and horizontal surface (parallel surface) 11b which crosses the vertical surface 11a and is parallel with the optical axis. The horizontal surface 11b is a part of an inner circumferential surface of the projecting section. Further, image side surface 12, which is in direction perpendicular to the optical axis is provided on the opposite side of the optical axis side on the projecting section. Incidentally, in the embodiment, image side surface 12 is made to be a mirror plane which is continuous with vertical surface 11a on the same plane.

On the other hand, in lens 2, a projecting section, having a cut-off form on the opposite side of the optical axis and projecting to lens 1 side, is provided on the flange section which is outside the optical functional section, and touching section 21 is provided on the cut-off form section. Touching section 21 is provided with vertical surface 21a which is perpendicular to the optical axis of lens 2, and horizontal surface 21b which crosses the vertical section 21a and is in parallel with the optical axis. The horizontal surface 21b is a part of an outer circumferential plane of the projecting section. The optical surface of the lens 2 closer to an object is formed to be projecting from the projecting section toward an object in axis direction.

Further, on the portion which is closer to the image and is outside the of the optical functional section of the lens 2, there was provided recessed portion 23 that is recessed to be closer to the subject than the position on the optical surface closest to the object, preferably, recessed to be closer to the object than the position closest to the image in the optical axis direction. In the embodiment, recessed portion 23 is provided on the outskirts of the optical functional surface, on the circumferential section outside the optical functional surface. By designing the metal mold so that burrs generated on the plastic-molded lens may agree positionally with recessed portion 23, it is possible to prevent that the surface of an optical disk arranged to be close is touched by the burrs and the optical disk is damaged. To put it concretely, to prepare separately the metal mold for the section including the optical surface that requires higher precision, and the metal mold for the peripheral parts, is preferable in terms of making the metal molds for the optical surface sections, and in terms of cost. In this case, by arranging a mating surface of the metal mold to agree positionally with recessed portion 23, it is possible to prevent that the burrs are produced from the position of the lens 2 closest to the image, which is preferable. Further, it is possible to reduce opportunities of contact between lens 2 and the optical information recording medium, caused by a warp of the optical information recording medium representing the optical disk.

Still further in the embodiment, image side plane 22 perpendicular to the optical axis is provided on a part of recessed portion 23, concretely for example, on the outskirts of recessed portion 23. Image side plane 22 is the mirror surface that is the same as image side surface 12. Since image planes 12 and 22 are the mirrors which are perpendicular to the optical axes of lenses 1 and 2 respectively, when assembling, by using image side planes 12 and 22 for reflecting surfaces, and by using a light source and a sensor, it is possible to prevent a tilted coupling between lens 1 and lens 2, or tilted mounting of objective lens 10 for the optical pick-up and the lens barrel of the optical pick-up, and thereby to perform the fixing and positioning with high accuracy.

In FIG. 1, R1, R2, R3 and R4 are the optical surfaces corresponding to the optical functional sections respectively. When assuming that a first surface, a second surface, a third surface and a fourth surface are arranged in this order from the optical surface arranged to be closer to the object side, then the first surface R1 and the third surface R3 are structured to be convex surfaces which are convex to the image side. The convex surfaces are aspheric surfaces. The second surface R2 is a concave surface being slightly concave to the object side, and the fourth surface R4 is a flat surface that is in the direction perpendicular to the optical axis. When symbol R4 representing the fourth optical surface is structured to be the flat surface that is in the direction perpendicular to the optical axis, like this way, the part outside the optical surface is easily formed to be the surface continuing to the optical surface, and by making at least one part of the plane which is perpendicular to the optical axis to be a mirror surface, it is possible to apply the mirror surface as a substitute of image side plane 22, without providing image side plane 22 specially.

Since objective lens 10 for the optical pick-up is composed of two plastic-molded lenses having four optical surfaces, the effect of the accuracy of each optical surface on the optical performance can be controlled to a lower level, and the degrees of freedom for the design of the optical surface can be improved accordingly. Further, by making the first surface and the third surface to be the convex surfaces toward the object side to distribute convex refracting interfaces, the high performance objective lens for the optical pick-up that can deal with the higher numerical aperture is realized. Still further, by making the second surface to be a concave surface, an air clearance of the lenses on the optical axis is smaller, and each lens can be arranged closer, and accordingly, it is possible to make a thickness of the objective lens for the optical pick-up thinner, though two or more lenses are used. In the embodiment, the thickness on the optical axis is about 4 to 5 mm. Still further, by making the fourth surface to be perpendicular to the optical axis as in the embodiment, the production of the metal mold becomes easier, and the form accuracy and the surface roughness can be easily improved. Still further, occurrence of the deterioration of the optical performance caused by the shift of both optical surfaces can be prevented, which is preferable.

Both of plastic-molded lenses 1 and 2 which are obtained to be in the above-mentioned shapes by the injection molding are combined into the objective lens for the optical pick-up. Incidentally, the combination of the lens 1 and lens 2 can be performed when they are incorporated in the optical pick-up, or after one lens is incorporated in the lens barrel (that is, bobbin), the other lens can be combined. In the embodiment, there will be mainly explained an example wherein lenses 1 and 2 are combined, and then, they are incorporated in the optical pick-up. When they are assembled by this manner, the productivity for assembling the optical pick-up becomes higher and assembling accuracy can be improved, because the combination to the lens barrel can be completed by one time.

In the embodiment, the combination of lens 1 and lens 2 is performed by making touching section 11 of lens 1 to be brought into contact with touching section 21 of lens 2. The relative positioning for lens 1 and lens 2 is performed by this contact. The relative positioning in the direction of the optical axis is obtained by the contact of vertical surface 11a and vertical surface 21a, and the air clearance between lens 1 and lens 2 can be established to the desired distance on the axis. The relative positioning in the direction perpendicular to the optical axis is performed by the contact of horizontal surface 11b and horizontal surface 21b, and the optical axis of lens 1 and optical axis of lens 2 can be arranged on the same axis, or can be settled within the desired range of divergence. In the manner mentioned above, the relative positioning in the optical axis direction or the relative positioning in the direction perpendicular to the optical axis direction can be conducted by the contact, in the invention, the objective lens for the optical pick-up using a plurality of plastic-molded lenses can be assembled accurately and easily and the mass production is also available.

When viewed in the direction of the optical axis, each of horizontal surfaces 11b and 21b is a circular form whose center is nearly on the optical axis, and the diameter of horizontal surface 11b having the center on the optical axis is formed to be slightly smaller than that of horizontal surface 21b. Due to this, lens 1 and lens 2 are engaged and held in close fitting to each other, then lens 1 and lens 2 are combined each other. It is preferable to obtain strength that touching sections 11 and 21 are glued together with an ultraviolet hardening type adhesive agent. When they are glued with the adhesive agent, it is preferable that the adhesive agent are not applied on vertical surfaces 11a and 21a, or the adhesive agent are prevented from flowing into vertical surfaces 11a and 21a, in order to attain the lens performance of the objective lens for the optical pick-up by obtaining the accuracy of the distance between lenses on the optical axis.

Further, diameter y of image side optical surface R4 of lens 2 is designed to be not more than 40% of circumferential diameter x2 of lens 2. On the other hand, circumferential diameter x2 is designed to be not less than 2.5 times the diameter y of optical surface R4. Due to this, a molding accuracy for micro optical surfaces (that is, diameter of optical surface R3 is 0.2 mm approximately, and that of optical surface R4 is 0.1 mm approximately) of lens 2 is made to be excellent. Further, optical surface R4 is away from the touching section so that change of the optical performance for the environmental change may be controlled. Still further, circumferential diameter x1 of lens 1 is designed to be larger than circumferential diameter x2 of lens 2. Due to this, objective lens 10 for optical pick-up can be easily handled, when lens 1 is fixed with adhesive agent to be mounted on the lens barrel holding the objective lens, and for example, it is possible to rotate lens 2 around its optical axis by grasping the outer circumferential surface of lens 2, and to mount lens 2 easily at the desired rotation position. This is the same, also for the case that lens 2 is brought into contact with lens 1 and fixed, after lens 1 is fixed on the lens barrel.

FIG. 2 shows an optical pick-up wherein objective lens 10 for the optical pick-up shown in FIG. 1 is applied. In optical pick-up 110, light flux emitted from semiconductor laser 101 representing a light source passes through beam splitter 102 representing a light combining means, and is changed to parallel light flux via collimator lens 103, then, the parallel light flux passes through quarter wavelength plate 104, and is stopped down to the prescribed numerical aperture by diaphragm 107, and forms a spot on information recording surface 122 through objective lens 10, and through transparent base board 121 of optical disk 120 representing an optical information recording medium.

The reflected light flux which is modulated by an information bit on information recording surface 122 is changed again to the parallel flux via objective lens 10, and the parallel flux is changed to convergent light via diaphragm 107, quarter wavelength plate 104 and collimator lens 103, and is reflected by beam splitter 102, then, astigmatism is corrected and magnification is changed via cylindrical lens 108, and the parallel light flux is converged to a light receiving surface of optical detector 109. Incidentally, the numeral 105 in FIG. 2 shows an actuator representing a distance adjusting means for focus control and tracking control, and it is structured to drive an unillustrated lens barrel (bobbin) holding lens 1 of objective lens 10 wherein lenses 1 and 2 are combined, with actuator 105.

To make the embodiment of the optical pick-up illustrated above to be of higher performance answering the higher numerical aperture and the shorter wavelength of the light source, it is preferable to use the optical pick-up having a means to correct the change of a spherical aberration and to correct chromatic aberration, instead of collimator lens 103. As the means to correct the change of a spherical aberration and to correct a chromatic aberration, for example, it is possible to use an optical system including a movable lens which can change a divergent angle of emerging light flux to incident light flux. The objective lens for the optical pick-up of the present invention can also be applied to such embodiment of the optical pick-up.

It is a matter of course that the optical pick-up in every case is designed to be not more than Marechal's criterion which is a minimum performance as the optical pick-up, and satisfies the performance.

(The Embodiment of 1-2)

Figure 3:
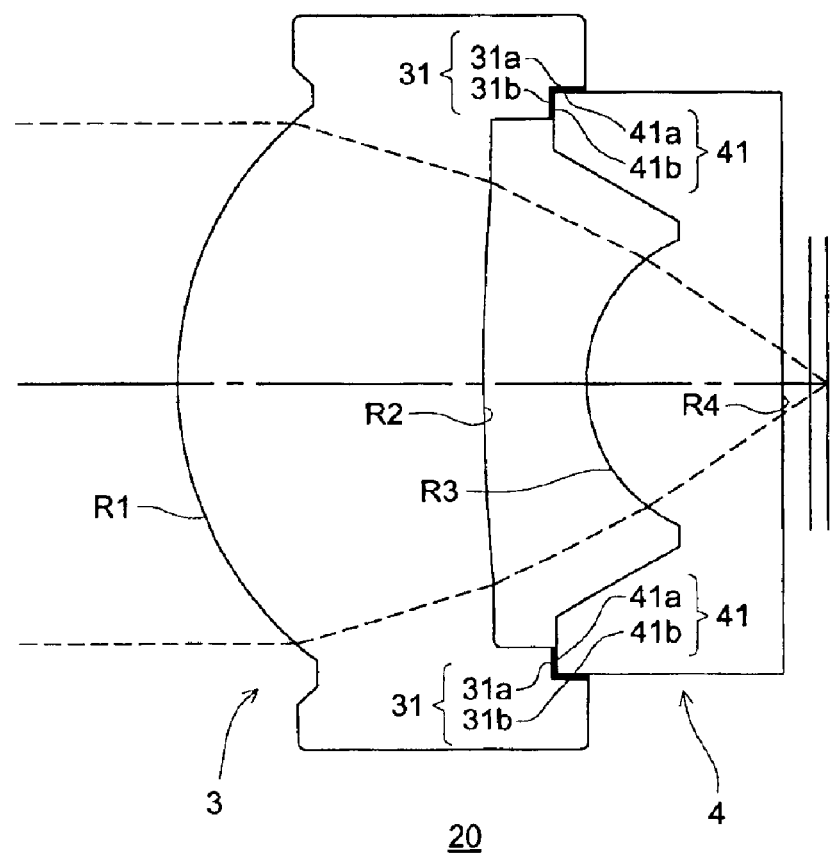
FIG. 3 is a sectional view showing a second embodiment of an objective lens for an optical pick-up of the invention.

FIG. 3 is a sectional view showing the other embodiment of an objective lens for an optical pick-up, and the explanation about the same structure as FIG. 1 will be omitted. In FIG. 3, objective lens 20 for an optical pick-up is an example structured by two plastic-molded lenses representing lens 3 of an object side and lens 4 of an image side. Each of these lenses 3 and 4 is produced by the injection molding, and has an outer circumferential form that is nearly circular, and has a nearly circular optical functional section around the optical axis, when they are viewed in the direction of the optical axis.

In lens 3, a projecting section having a cut-off form on the optical axis side and projecting to lens 4 side is provided on the flange section representing the portion outside the optical functional section, and touching section 31 having vertical surface 31a perpendicular to the optical axis of lens 3 and having horizontal surface 31b crossing the vertical surface 31a and being in parallel with the optical axis is provided on the optical axis side of the projecting section. On the other hand, in lens 4, a projecting section projecting to lens 3 side is provided on the flange section which is outside the optical functional section, and touching section 41 having vertical surface 41a perpendicular to the optical axis of lens 4 and having horizontal surface 41b crossing vertical surface 41a and being in parallel with the optical axis is provided on the opposite side of the optical axis side of the projecting section. Further, the first surface R1 and the third surface R3 are the convex surfaces being convex to the object side, the second surface R2 is a concave surface being slightly concave to the object side, and the fourth surface R4 is a flat surface perpendicular to the optical axis of lens 4.

In the present embodiment which is the same as the first embodiment, the relative positioning for lens 3 and lens 4 is carried out when touching section 31 of lens 3 is brought into contact with touching section 41 of lens 4. However, the diameter of horizontal surface 31 b around the optical axis is formed to be slightly larger (from 3 μm to 10 μm) than that of horizontal surface 41b, when viewed in the direction of the optical axis, and lens 3 and lens 4 are formed to be engaged with clearance fitting, which is different from the first embodiment.

Accordingly, under the condition that horizontal surfaces 31a and 41a are brought into contact with each other so that the relative positioning in the direction of the optical axis is carried out, that is, under the condition that the air clearance between lens 3 and lens 4 is established to be the desired distance on the optical axis, it is easy to rotate lens 3 and lens 4 relatively, nearly around the optical axis, and it is possible to adjust an amount of a double refraction and an astigmatism by rotation adjustment, which is preferable. Objective lens 20 for the optical pick-up wherein lens 3 and lens 4 are strongly combined each other was obtained by using an ultraviolet hardening type adhesive agent in the clearance between horizontal surface 31b and horizontal surface 41b. In this case, in order to prevent a leakage of the adhesive agent to the outside of the contact section, it is preferable to provide a recessed portion representing a pool for the adhesive agent, on the image side of horizontal surface 41b or in the vicinity of horizontal surface 41b of the outer circumference of lens 4.

In such a clearance fitting, when lens 3 and lens 4 are moved relatively in the direction perpendicular to the optical axis in the engaging clearance, it is preferable that the clearance is limited so that the changing amount of a wave-front aberration at the image forming position in the optical pick-up may be not more than the diffraction limit power. Further, it is more preferable that the amount of clearance is limited within a tolerable level of a gap of the optical axes between two plastic-molded lenses being allowed to satisfy the performance of the optical pick-up.

(The other Embodiment of 1)

An objective lens for an optical pick-up of the invention and an optical pick-up wherein the objective lens for the optical pick-up is used are not limited to the embodiments mentioned above, the invention can be changed variably within the scope of the purport.

Figure 20:
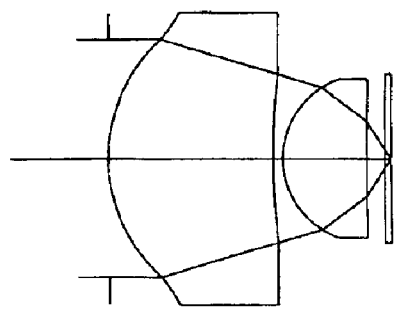
FIG. 20 is a diagram showing an optical path.
Figure 21:
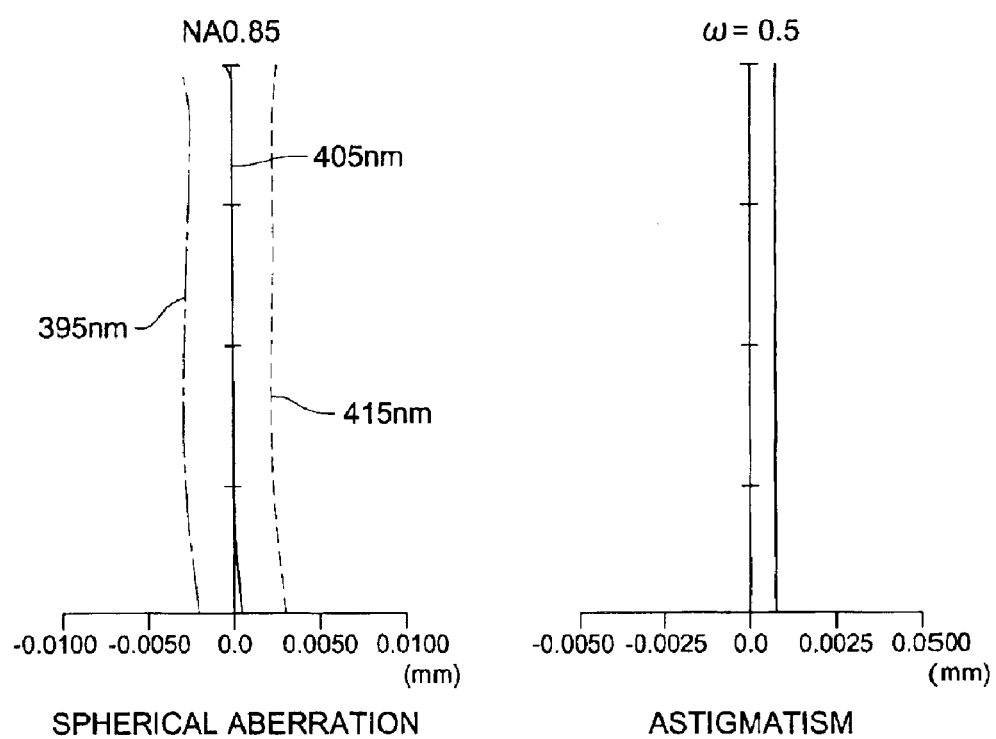
FIG. 21 is a diagram showing a aspherical aberration and astigmatism.

As stated above, using the lens structure of the present invention, it is possible to provide with an objective lens capable of corresponding to a higher numerical aperture for use in a high performance optical pick up device by the lens structure of the present invention. Then, the practical example to make NA (numerical aperture) to be 0.85 with the lens structure shown in FIG. 1, is described as follows. FIG. 20 is a diagram showing an optical path and FIG. 21 is a diagram showing a aspherical aberration and astigmatism. As shown in the optical data in Table 1, an objective of the present example is composed of two aspherical lenses, wherein the aspherical surface is formed on every surface from the first surface to the third surface. Plastic material is polyolefin resin, whose gravity is 1.0, saturation water-absorbing capacity is less than 0.01%. Consequently, it becomes possible to make the weight of the object lens of the present invention to be less than half the weight of an objective lens composed of two glass lenses, that is, though NA is 0.85 which is a large value, the weight of the plastic lens becomes about 0.02–0.04 g. In this manner, it becomes possible to produce an objective lens with NA of 0.8 to 0.9.

TABLE 1

| Surface NO. | | r (mm) | d (mm) | $N_\lambda$ | vd |
|---|---|---|---|---|---|
| 1 | Diaphragm | | | | |
| 2 (Aspheric 1) | Objective lens | 2.074 | 2.400 | 1.52491 | 56.5 |
| 3 (Aspheric 2) | | 8.053 | 0.100 | | |
| 4 (Aspheric 3) | | 0.863 | 1.100 | 1.52491 | 56.5 |
| 5 | | ∞ | 0.240 | | |
| 6 | Transparent substrate | ∞ | 0.100 | 1.61949 | 30.0 |
| 7 | | ∞ | 0.000 | | |

$\lambda$ = 405 nm, NA = 0.85

Aspherical surface coefficient

| Aspherical surface 1 | | Aspherical surface 2 | | Aspherical surface 3 | |
|---|---|---|---|---|---|
| $\kappa$ | −1.2955E−01 | $\kappa$ | 4.7554E+01 | $\kappa$ | −7.1425E−01 |
| $A_4$ | −3.7832E−03 | $A_4$ | 1.3641E−02 | $A_4$ | 1.3647E−01 |
| $A_6$ | 5.1667E−04 | $A_6$ | −2.9201E−02 | $A_6$ | −5.3414E−02 |
| $A_8$ | −1.1780E−03 | $A_8$ | −9.3339E−03 | $A_8$ | 3.0269E−01 |
| $A_{10}$ | −2.0628E−04 | $A_{10}$ | 3.3011E−02 | $A_{10}$ | −1.6898E−01 |
| $A_{12}$ | 2.5941E−05 | $A_1$ | −2.2626E−02 | | |
| $A_{14}$ | 1.4917E−04 | | | | |
| $A_{16}$ | −5.1578E−05 | | | | |

Figure 22:
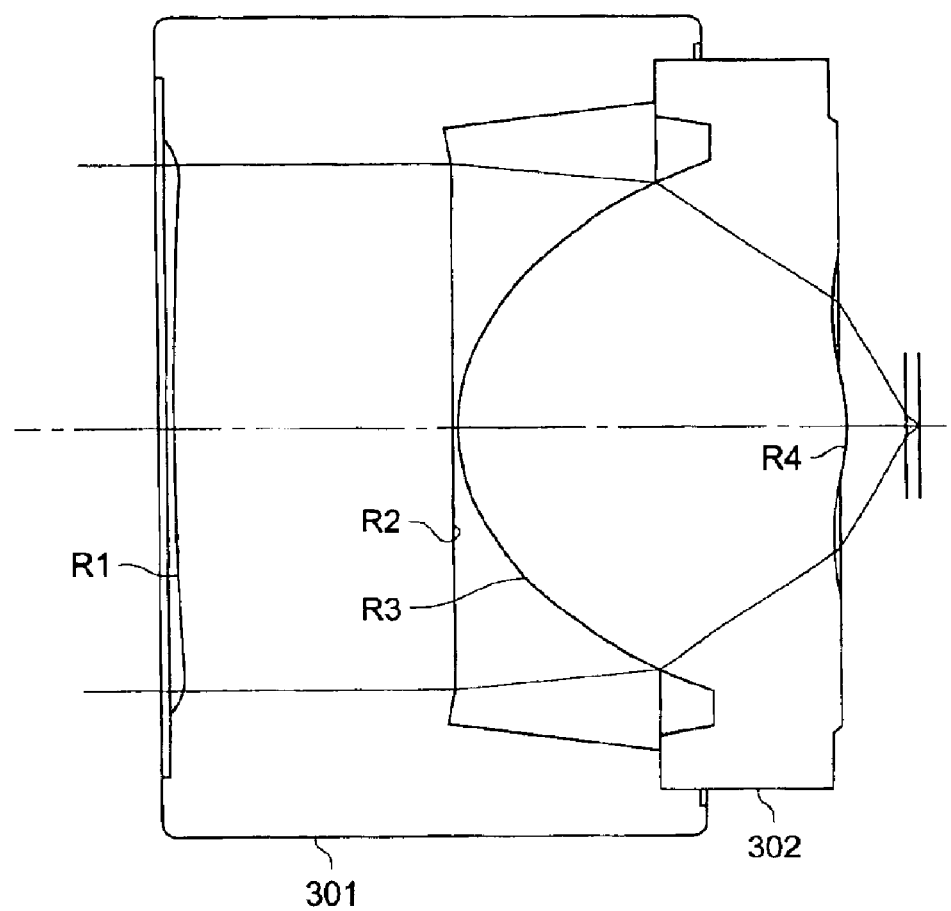
FIG. 22 is a sectional view showing a construction example using another optical member.

FIG. 22 shows the construction example using another optical member to which the lens structure shown in FIG. 3 can be applied. In FIG. 22, numeral 301 is an optical member, and a plurality of grooves are concentrically formed as ring-shaped zones on surface R1 facing the light source or on R2 facing the focusing point, and numeral 302 is a lens whose surface R3 facing the light source is convex. In the case of a diffractive lens, the ring-shaped zone is a ring-shaped diffractive zone, while in the case of an optical correction element, steps structured to correct a targeted aberration, for example, steps structured to provide a predetermined optical path difference are formed in the ring-shaped zone. In the structure shown in FIG. 22, a surface being parallel to the optical axis and a surface being perpendicular to the optical axis are provided on optical members 301 and 302 respectively so that a relative position between both optical members 301 and 302 can be determined. That is, the application of the structure of the present invention to determine the relative position between optical elements is not limited to the convex lens shown in FIG. 1 and FIG. 2 and the structure of the present invention can be applied to the optical members having the other shapes.

In the embodiment of the invention mentioned above, there is shown an example wherein the touching section is structured with the vertical plane and the horizontal plane which crosses the vertical plane, however, the invention is not limited to this form, but the various forms can be used. For example, the touching section can be structured by a trapezoid plane composed of one slope, or can be structured by an arc-shaped surface composed of a part of a spherical surface. In either case, it is preferable that the relative positioning for lenses in the direction of the optical axis and in the direction perpendicular to the optical axis is carried out by the contact of the touching sections.

Further, the touching sections are made to be circular each other, however, for the positioning for the two lenses in the direction of optical axis and/or in the direction perpendicular to the optical axis, there is no need to make all of the circular section to be the touching section, and for example, it is possible to make at least three sections at regular intervals to be the touching sections.

Further, in the above-mentioned embodiment, there is shown an example that the diameter of the lens closer to the object is greater than that of the lens closer to the image, however, the reverse can also be used. In the objective lens for the optical pick-up, the optical functional section needed for the image side lens can be relatively small. Therefore, it is preferable that the diameter of the image side lens is made smaller, because the diameter of the image side lens that is greater than is necessary is wasteful of materials of the plastic-molded lens, and it makes weight of the objective lens to be greater than is necessary.

Further, the invention is not limited to the occasion that the objective lens for the optical pick-up is composed of two plastic-molded lens only, and it can be applied to the occasion to use more than two plastic-molded lenses. In this case, it is naturally preferable that the adjoining lenses which face each other satisfy the aforesaid relation explained in detail in the embodiment stated above. Still further, in the embodiment, there is shown an example that the plastic-molded lens is produced by the injection molding, however, various molding methods including an injection compression molding can also be applied. The injection molding and the injection compression molding are excellent in terms of transferability from the metal mold to resins, and they make it possible to obtain plastic-molded lens having high accuracy closer to the design value and high performance, which is preferable.

In the present invention, as mentioned above, it is possible to obtain the plastic-molded lens, wherein the metal mold can be processed easily, and production of the plastic-molded lens is easy without having difficulty which happens in the case of the single molded objective lens, and lens performance can be made high with better transferability from the metal mold, and further it is easy to incorporate the plastic-molded lens to the optical pick-up, thus, the invention makes it possible to obtain an objective lens for an optical pick-up capable of coping easily with the higher numerical aperture and the miniaturization.

In the invention described in the Structure (1—1), contact between lenses makes it possible to attain highly accurate mutual positioning for the lenses easily. Further, the invention can perform the more accurate assembling of the objective lens for the optical pick-up, and can improve productivity for the mass production.

The invention described in the Structure (1-2) can perform the more accurate positioning without increasing the number of parts and man-hours for the mounting, because the lenses are combined directly each other.

In the invention described in the Structure (1-3), contact between lenses makes it possible to attain highly accurate mutual positioning for the lenses easily.

The invention described in the Structure (1-4) can perform the more accurate positioning without increasing the number of parts and man-hours for the mounting, because the lenses are combined directly each other, and further, the invention can secure the strength by making the neighboring section of the touching section of the object side lens holding the image side lens, such as the thickness in the direction of the diameter of the flange to be larger, and thereby can maintain the higher accuracy and the higher performance even under the change of environment.

The invention described in the Structure (1-5) makes its handling to be excellent, and makes it easy to assemble the lenses highly accurately. Further, for a warp on the optical information recording medium such as the optical disk, the invention can lessen frequency of the contact between the lens and the optical information recording medium.

The invention described in the Structure (1-6) makes it easy to process of the metal mold, and makes it easy to improve the form accuracy and surface roughness. Further, it is possible to prevent occurrence of the deterioration of the optical performance caused by the shift of both the optical surfaces.

The invention described in the Structure (1-7) can prevent that burrs generated by the mating surface of the metal mold touch the optical information recording medium. Further, regarding the warp of the optical information recording medium such as the optical disk, the invention can lessen frequency of the contact between the lens and the optical information recording medium.

In the invention described in the Structure (1-8), contact between lenses makes it possible to attain easily the positioning of the lenses each other in the direction of the optical axis. Further the invention can perform the more accurate assembling of the objective lens for the optical pick-up, and can improve productivity for the mass production.

In the invention described in the Structure (1-9), contact between surfaces perpendicular to the optical axis makes it possible to attain easily the highly accurate positioning of the lenses each other in the direction of the optical axis.

In the invention described in the Structure (1-10), contact between lenses makes it possible to attain easily the positioning of the lenses each other in the direction perpendicular to the optical axis. Further the invention can perform the more accurate assembling of the objective lens for the optical pick-up, and can improve productivity of the mass production.

In the invention described in the Structure (1-11), contact between surfaces which are in parallel with the optical axis makes it possible to attain easily the highly accurate positioning for the lenses each other in the direction perpendicular to the optical axis.

In the invention described in the Structure (1-12), contact between lenses makes it possible to attain easily the positioning for the lenses each other in the direction of the optical axis and in the direction perpendicular to the optical axis. Further the invention can perform the more accurate assembling of the objective lens for the optical pick-up, and can improve productivity for the mass production.

In the invention described in the Structure (1-13), contact between surfaces perpendicular to the optical axis and contact between surfaces which are in parallel with the optical axis make it possible to attain easily highly accurate positioning of the lenses each other, in the optical axis direction, and in the direction perpendicular to the optical axis.

The invention described in the Structure (1-14) can easily hold the lenses each other with the simple construction.

The invention described in the Structure (1-15) can easily perform the relative rotation of the lenses each other and the adjustment of the gap between the optical axes each other, and can improve the total optical performance of the objective lens.

The invention described in the Structure (1-16) can keep easily the highly accurate positioning for the lenses each other, and can keep the lenses securely, because the lenses are fixed after the engagement through fitting.

The invention described in the Structure (1-17) can utilize the effective optical surfaces having air clearance, without damaging the optical surface, because the facing optical surfaces of the lenses do not touch each other, even when the touching sections of the lenses touch each other. Further, the invention can control the lens distance easily, and can control the lens distance easily to control the spherical aberration, by properly controlling the height of the touching section in the direction of the optical axis which is outside the optical functional section.

The invention described in the Structure (1-18) improves the molding accuracy of the micro optical surface. Further, the invention can control the occurrence of the strain on the optical surface during the assembling of the objective lens for the optical pick-up, and can control the change of the optical performance, even when environmental conditions are changed.

The invention described in the Structure (1-19) can attain the stable form accuracy of the touching sections, without damaging the fluidity of resin even in the case of the injection molding, because the touching section is provided circularly on the circumferential area of the optical functional section.

The invention described in the Structure (1-20) can detect easily the inclination of the optical axes of the lenses each other or the inclination of the optical axes to another optical system, and can perform the adjustment easily.

The invention described in the Structure (1-21) can detect more easily the inclination of the optical axes of the lenses each other or the inclination of the optical axes to another optical system, and can easily perform the highly accurate adjustment.

The invention described in the Structure (1-22) makes it possible to provide easily the optical pick-up having the higher numerical aperture and the higher optical performance wherein the above-mentioned objective lens for the optical pick-up is used.

The invention described in the Structure (1-23) is suitable for the optical pick-up.

The invention described in the Structure (1-24) makes it possible to obtain easily the optical pick-up having the minimum necessary performance of the objective lens, without being required to have highly accurate positioning.

In the invention described in the Structure (1-25) or (1-26), it is possible to mount an objective lens on an optical pick-up in a simple way, by incorporating one lens in the objective lens for the optical pick-up composed of two or more lenses, on the lens barrel.

Referring to the drawings, an optical unit and an optical device having the optical unit of the embodiment of the invention to achieve the second object will be explained.

(The Embodiment of 2-1)

Figure 4:
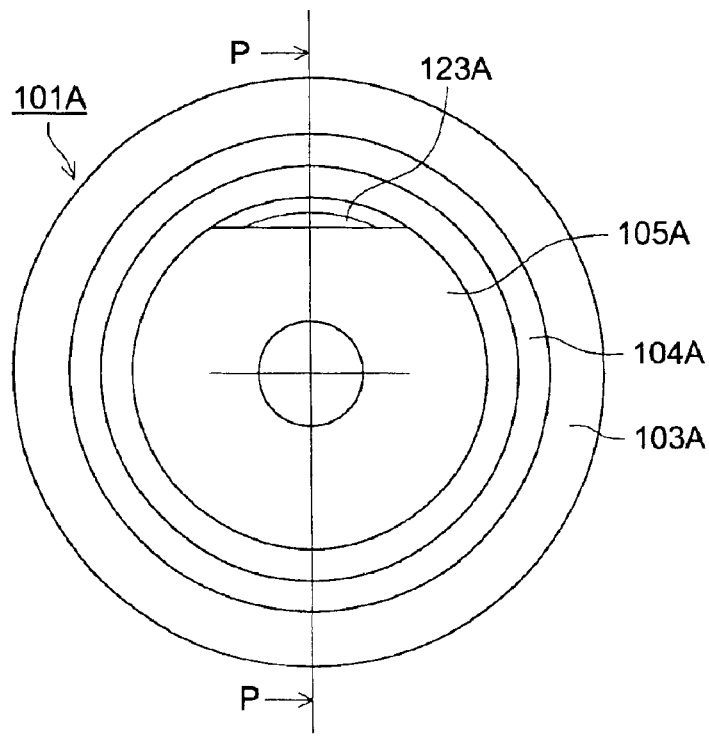
FIG. 4(a) is a back view and FIG. 4(b) is a sectional side view showing a main construction of the optical device of the embodiment of 2-1.
Figure 4:
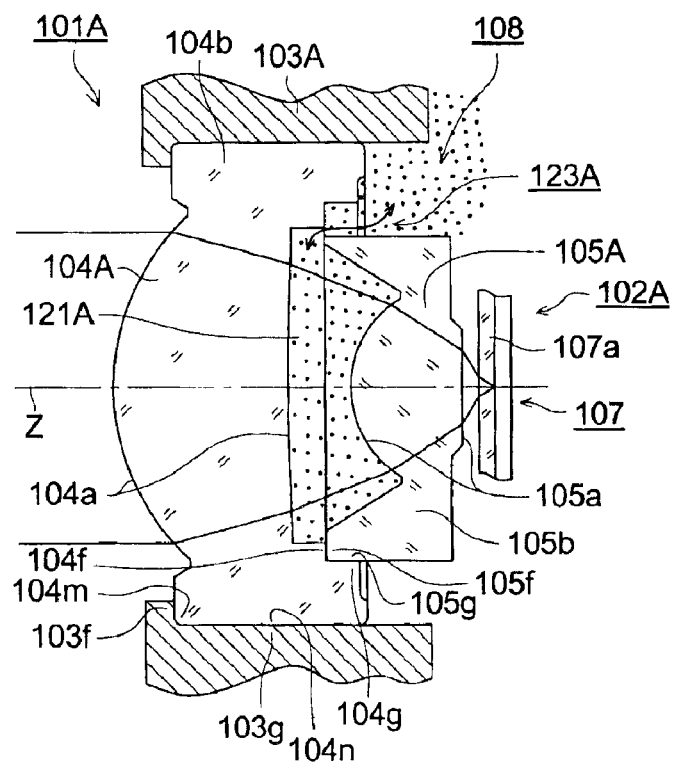

FIG. 4 is a back view and a sectional side view showing a main construction of the optical device of the embodiment. As shown in FIG. 4, optical device 101A is an optical device for an optical pick-up having optical unit 102A, and the optical device 101A is composed of an unillustrated laser light source, optical unit 102A and holding member 103A. Incidentally, the symbol 107 is an optical disk and the symbol 107a is a transparent protection layer of the optical disk.

The optical unit 102A is composed of first optical element 104A and second optical element 105A, and is fixed with flange 104b and flange 105b. Further, the optical unit 102A has space 121A surrounded with the first optical element 104A and the second optical element 105A, and is fixed with the holding member 103A.

The first optical element 104A has two effective optical surfaces 104A, flange 104b projecting perpendicularly to optical axis Z, surface 104f touching the second optical element 105A, section 104g engaging with the second optical element, surface 104m touching the holding member 103A and section 104n engaging with the holding member 103A respectively. Further the first optical element 104A is a positive lens of a plastic molded type.

The second optical element 105A has two effective optical surfaces 105A, flange 105b projecting perpendicularly to optical axis Z, surface 105f touching the first optical element 104A and section 105g engaging with the first optical element 104A. Further the second optical element 105A is a positive lens of a plastic molded type.

The space 121A is a space which is surrounded with effective optical surface 104A of the first optical element 104A, and effective optical surface 105A of the second optical element 105A. Further, air duct 123A is provided near the section touching the first optical element 104A and the second optical element 105A, and it is a duct through which air representing gas in the space 121A is communicated with outside air 108, under the condition that the optical unit 102A is integrated in holding member 103A.

The optical device 101A holds the optical unit 102A without blocking the air duct 123A formed on the optical unit 102A. The holding member 103A has section 103g engaging with the optical unit 102A and surface 103f touching the optical unit 102A, and holds the optical unit 102A.

With the foregoing as a background, air in the space 121A is communicated with the outside air 108 through the air duct 123A, and thereby, a decline of the surface accuracy of the effective optical surface caused by expansion or contraction of air due to a change of an ambient temperature and dew condensation due to a temperature fall hardly occur in the optical device 101A and the optical unit 102A.

(The Embodiment of 2—2)

Figure 5A:
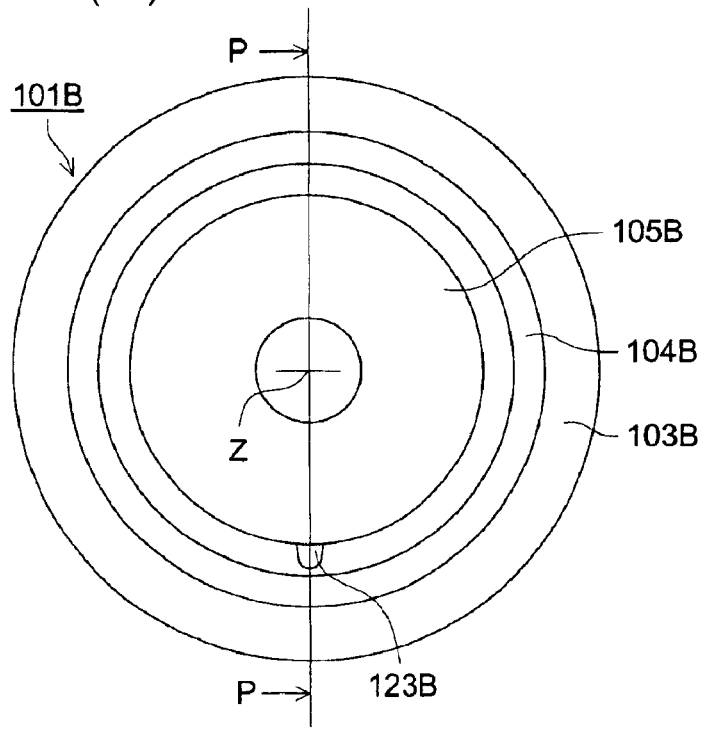
FIG. 5(a) is a back view and FIG. 5(b) is a sectional side view showing a main construction of the optical device of the embodiment of 2—2.
Figure 5B:
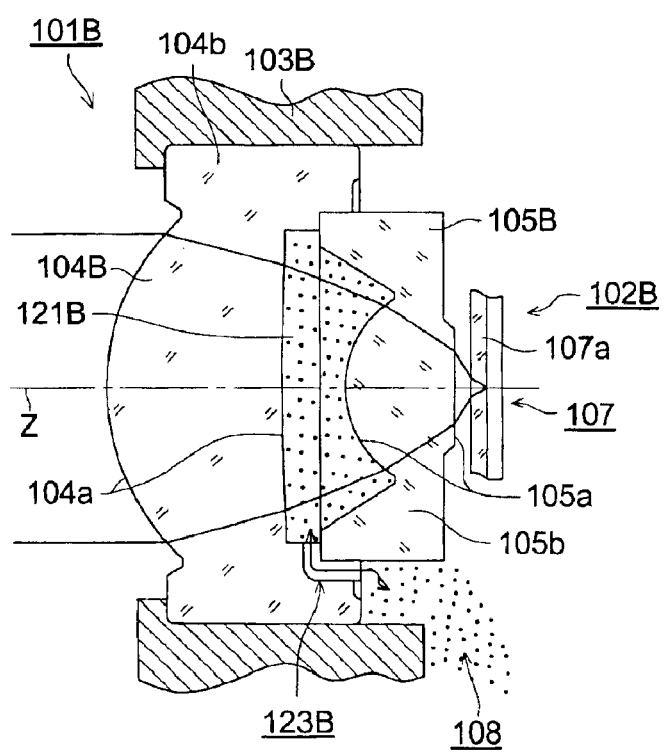

This embodiment is an example wherein the air duct is different from that in the embodiment of 2-1. The parts or portions which are the same as those in the first embodiment are given the same symbols, and explanations are omitted. FIG. 5 is a back view and a sectional side view showing a main construction of another optical device of the embodiment. As shown in FIG. 5, optical device 101B is an optical device for an optical pick-up having optical unit 102B, and the optical device 101B is composed of an unillustrated laser light source, optical unit 102B and holding member 103B

The optical unit 102B is composed of first optical element 104b and second optical element 105b, and has space 121B. The first optical element 104b and the second optical element 105b are positive lenses of a plastic molding type. The space 121B is a space which is surrounded with the first optical element 104b and the second optical element 105b which are including the effective optical surfaces. Further, air duct 123B is an L-shaped air duct which is formed on the first optical element 104b, and air in the space 121B is communicated with the outside air 108.

The optical device 101B holds the optical unit 102B by the holding member 103B without blocking the air duct 123B formed on the optical unit 102B.

With the foregoing as a background, a decline of the surface accuracy of the effective optical surface caused by expansion or contraction of air due to a change of an ambient temperature and dew condensation due to a temperature fall hardly occur in the optical device 101B and the optical unit 102B, which is the same as the case in the first embodiment.

(The Embodiment of 2-3)

Figure 6:
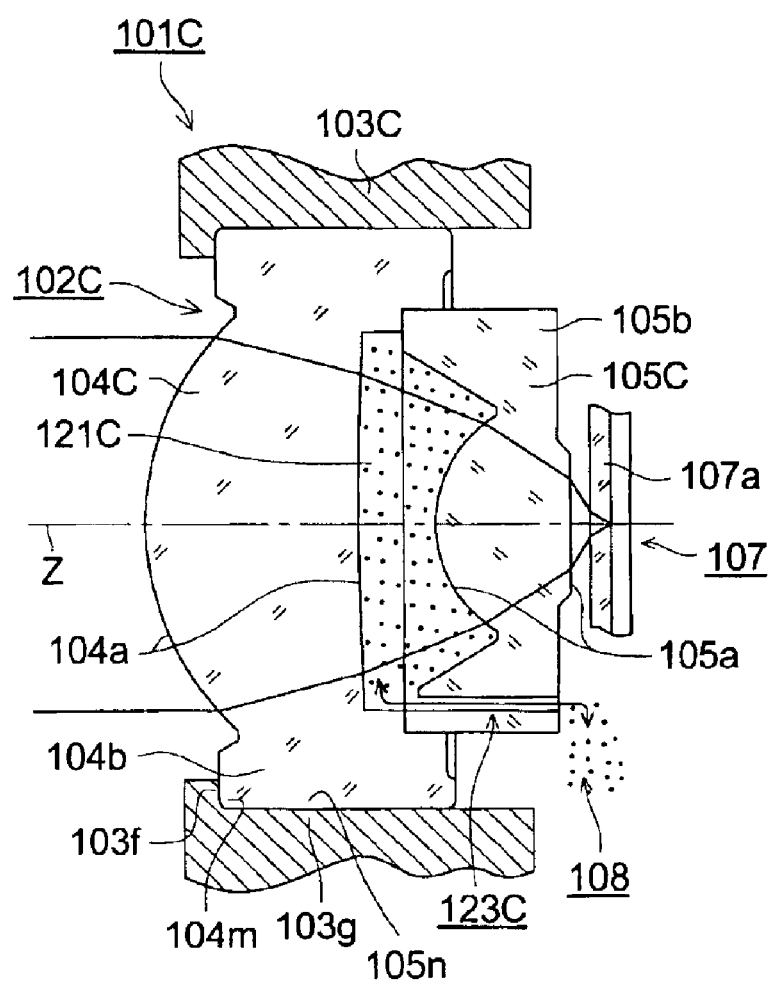
FIG. 6 is a sectional side view showing a main construction of the optical device of the embodiment of 2-3.

This embodiment is an example wherein the air duct is different from that in the first embodiment. The parts or portions which are the same as those in the embodiment of 2-1 are given the same symbols, and explanations are omitted. FIG. 6 is a back view and a sectional side view showing a main construction of another optical device of the embodiment. As shown in FIG. 6, optical device 101C is an optical device for an optical pick-up having optical unit 102C, and the optical device 101C is composed of an unillustrated laser light source, optical unit 102C and holding member 103C.

The optical unit 102C is composed of first optical element 104C and second optical element 105C, and has space 121C. The first optical element 104C and the second optical element 105C are positive lenses of a plastic molding type. The space 121C is a space which is surrounded with the first optical element 104C and the second optical element 105C which are including the effective optical surfaces. Further, air duct 123C is an air duct wherein the section of air duct 123C is formed to be in the straight shape to the second optical element 105C side, and air in the space 121C is communicated with the outside air 108. Incidentally, the air duct can also be provided at the first optical element 104C side.

The optical device 101C holds the optical unit 102C by the holding member 103C without blocking the air duct 123C formed on the optical unit 102C.

With the foregoing as a background, a decline of the surface accuracy of the effective optical surface caused by expansion or contraction of air due to a change of an ambient temperature and dew condensation due to a temperature fall hardly occur in the optical device 101C and the optical unit 102C.

(The Embodiment of 2-4)

Figure 7:
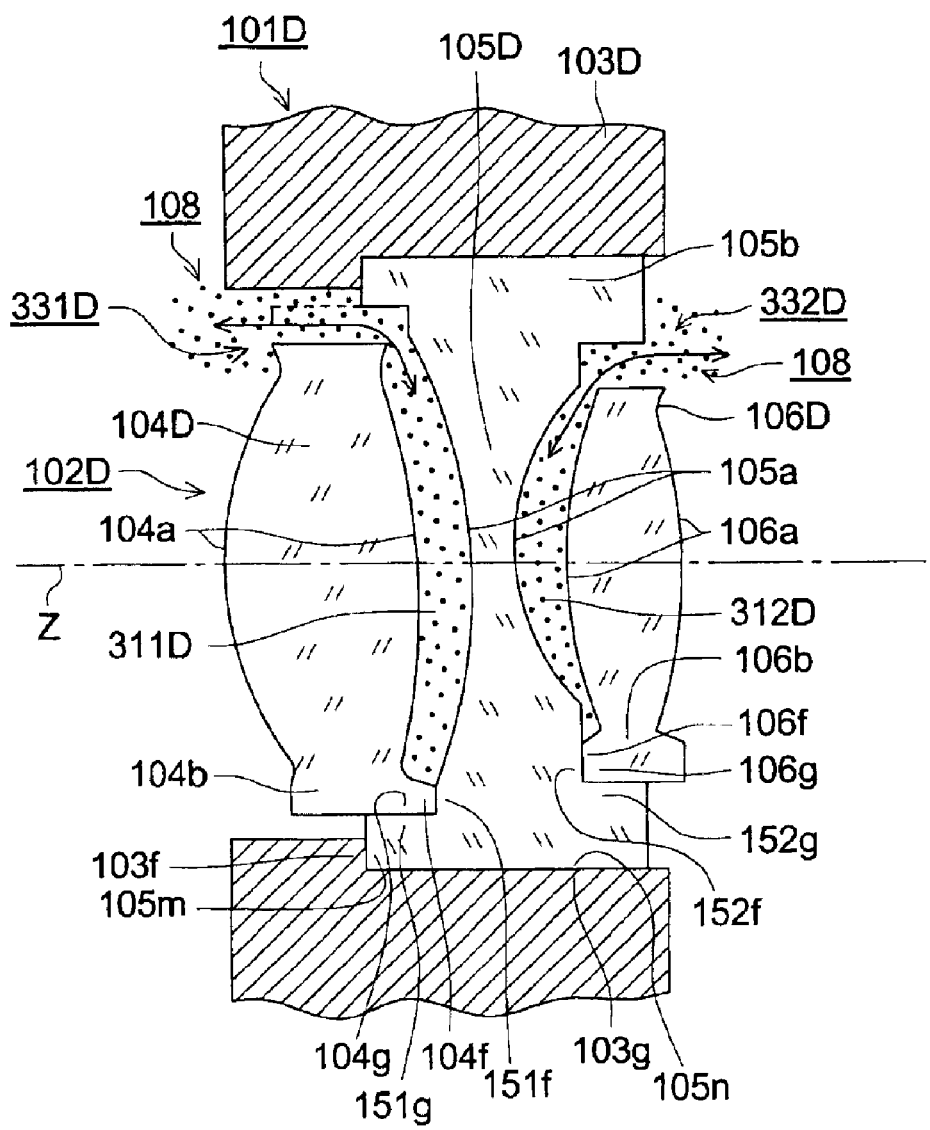
FIG. 7 is a sectional side view showing a main construction of the optical device of the embodiment of 2-4.

This embodiment is an example wherein there is an air duct in each of the two spaces. FIG. 7 is a sectional side view showing a main construction of another optical device of the embodiment. As shown in FIG. 7, optical device 101D is an optical device for photographing the object, and the optical device 101D is composed of optical unit 102D and holding member 103D.

The optical unit 102D is composed of first optical element 104D, second optical element 105D and third optical element 106D, and is fixed with flanges 104b, 105b and 106b. Further, the optical unit 102D has space 211D and space 212D.

Incidentally, one of the adjacent optical elements is called the first optical element, and the other is called the second optical element, and in this case, the first optical element 104D and the second optical element 105D represent the adjacent optical elements, and the second optical element 105D and the third optical element 106D represent the adjacent optical elements.

The first optical element 104D has two effective optical surfaces 104A, flange 104b projecting perpendicularly to optical axis Z, surface 104f touching the second optical element, and section 104g engaging with the second optical element. Further the first optical element 104D is a positive lens of a plastic molding type.

The second optical element 105D has two effective optical surfaces 105A, flange 105b projecting perpendicularly to the optical axis Z, surface 151f touching the first optical element, section 151g engaging with the first optical element, surface 152f touching the third optical element, section 152g engaging with the third optical element, surface 105m touching holding member 103D and section 105n engaging with the holding member 103D. Further the second optical element 105D is a negative lens of a plastic molding type.

The space 211D is a space which is surrounded with the first optical element 104D and the second optical element 105D including the effective optical surfaces. Further, air duct 231D is a duct through which air in the space 211D is communicated with outside air 108, under the condition that the optical unit 102D is integrated in holding member 103D.

The third optical element 106D has two effective optical surfaces 106a, flange 106b projecting perpendicularly to the optical axis Z, surface 106f touching the second optical element, and section 106g engaging with the second optical element. Further the second optical element 106D is a positive lens of a plastic molding type.

The space 212D is a space which is surrounded with the second optical element 105D and the third optical element 106D including the effective optical surfaces. Further, air duct 232D is a duct through which air in the space 212D is communicated with outside air 108, under the condition that the optical unit 102D is integrated in holding member 103D.

The optical device 101D holds the optical unit 102D by the holding member 103D without blocking the air ducts 231D and 232D formed on the optical unit 102D. The holding member 103D has surface 103F touching the optical unit 102D and section 3g engaging with the optical unit 102D.

With the foregoing as a background, a decline of the surface accuracy of the effective optical surface caused by expansion or contraction of air due to a change of an ambient temperature and dew condensation due to a temperature fall hardly occur in the optical device 101D and the optical unit 102D.

(The Embodiment of 2-5)

Figure 8:
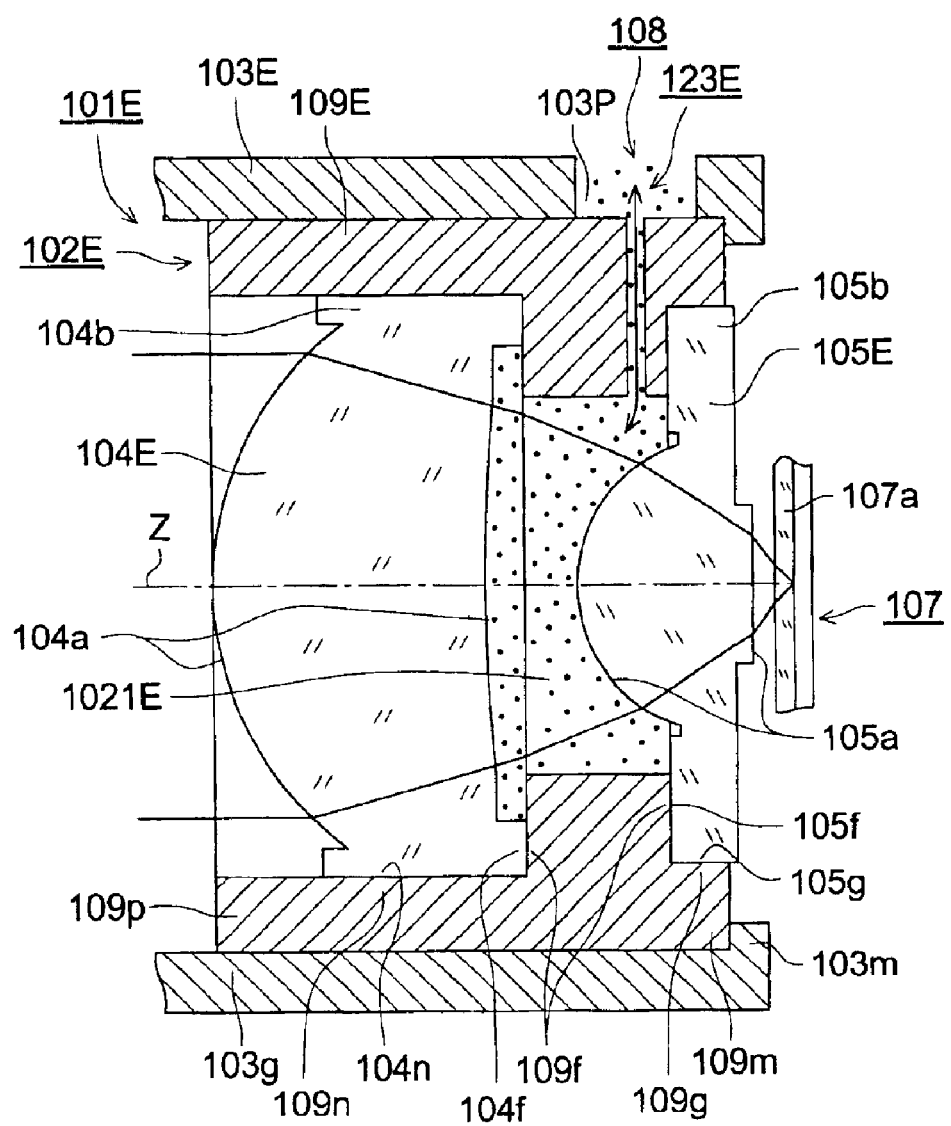
FIG. 8 is a sectional side view showing a main construction of the optical device of the embodiment of 2-5.

This embodiment is an example wherein there is an air duct in the intermediate holding member. FIG. 8 is a sectional side view showing a main construction of another optical device of the embodiment. As shown in FIG. 8, optical device 101E is a device for an optical pick-up, and is composed of an unillustrated laser light source, optical unit 102E and holding member 103E.

The optical unit 102E is composed of first optical element 104E, second optical element 105E and intermediate holding member 109E, and has space 121E.

The first optical element 104E has two effective optical surfaces 104A, flange 104b projecting perpendicularly to the optical axis Z, surface 104f touching the intermediate holding member and section 104n engaging with the intermediate holding member. Further the first optical element 104E is a positive lens of a plastic molding type.

The second optical element 105E has two effective optical surfaces 105A, flange 105b projecting perpendicularly to the optical axis Z, surface 105f touching the intermediate holding member and section 105g engaging with the intermediate holding member. Further the second optical element 105A is a positive lens of a plastic molding type.

The intermediate holding member 109E holds the first optical element 104E and the second optical element 105E. The intermediate holding member 109E has sections 109f touching the first optical element 104E and the second optical element 105E, section 109g touching the second optical element 105E, section 109n engaging the first optical element 104E, surface 109m touching the holding member 103E and section 109p engaging with the holding member 103E.

The space 121E is a space which is surrounded with the first optical element 104E, the second optical element 105E and the intermediate holding member 109E. Air duct 123E is an air duct wherein the section of the air duct 123E is formed to be in the straight shape to the intermediate holding member 109E side, under the condition that the optical unit 102E is integrated in holding member 103E, air in the space 121E is communicated with the outside air 108.

The optical device 101E holds the optical unit 102E without blocking the air duct 123E formed on the optical unit 102E. The holding member 103E has section 3g engaging with the optical unit 102E, surface 103m touching the optical unit 102E and hole 3p which prevents the air duct 123E from being blocked, and holds the optical unit 102E.

With the foregoing as a background, a decline of the surface accuracy of the effective optical surface caused by expansion or contraction of air due to a change of an ambient temperature and dew condensation due to a temperature fall hardly occur in the optical device 101E and the optical unit 102E.

(The Embodiment of 2-6)

Figure 9:
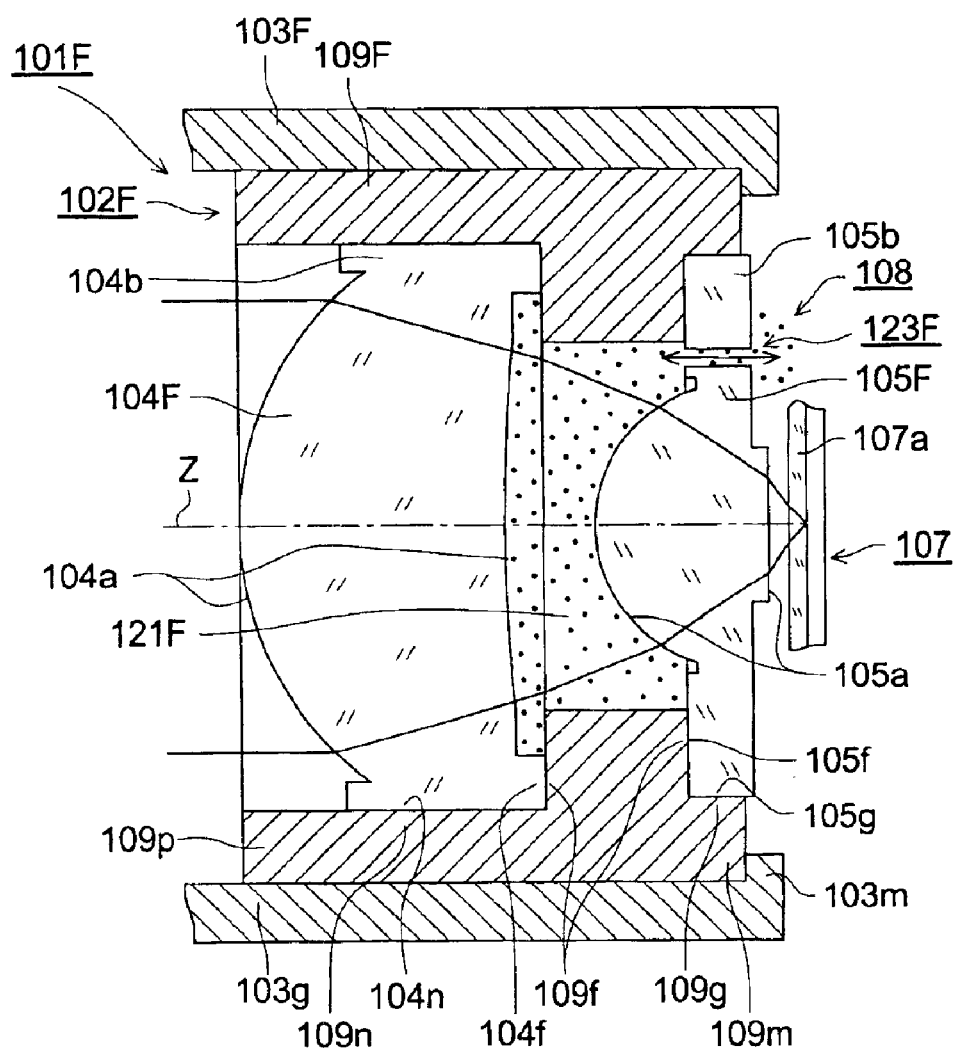
FIG. 9 is a sectional side view showing a main construction of the optical device of the embodiment of 2-5.
Figure 10:
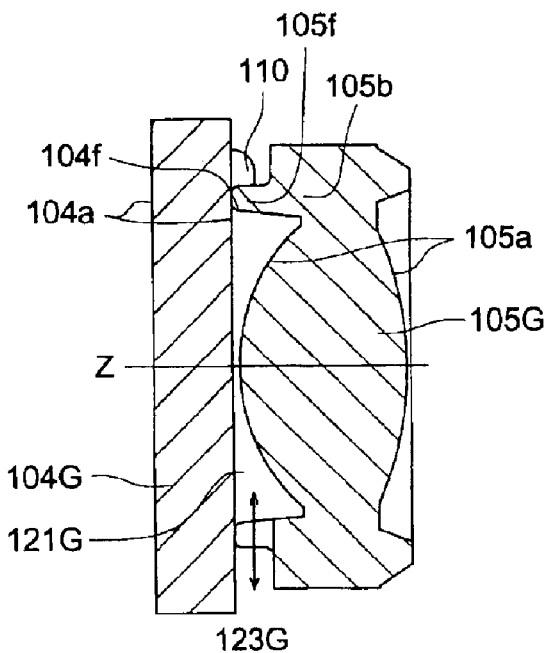
FIG. 10(a) is a sectional side view and FIG. 10(b) is a bottom view showing a main construction of the optical device of the embodiment of 2-7.
Figure 10:
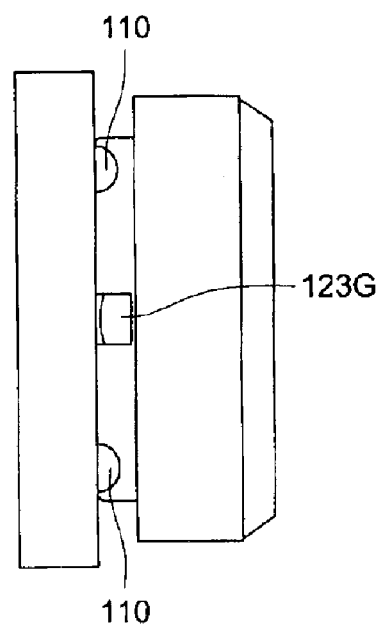
Figure 11:
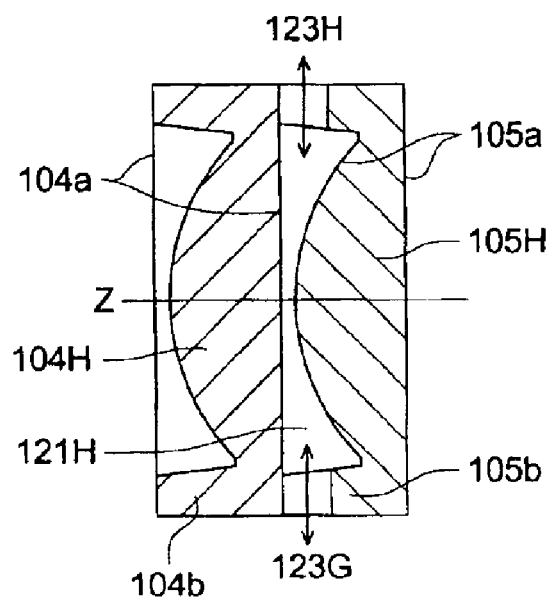
FIG. 11(a) is a sectional side view and FIG. 11(b) is a bottom view showing a main construction of the optical device of the embodiment of 2-8.
Figure 11:
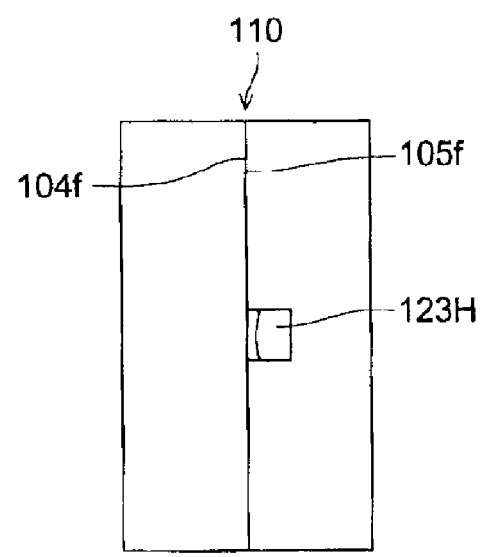

This embodiment is a variation of an example of the embodiment of 2-5. The parts or portions which are the same as those in the first embodiment are given the same symbols, and explanations are omitted. FIG. 9 is a sectional side view showing a main construction of another optical device of the embodiment.

As shown in FIG. 9, optical device 101F is an optical device for the optical pick-up, and is composed of an unillustrated laser light source, optical unit 102F and holding member 103F.

Optical unit 102F is composed of first optical element 104f, second optical element 105f and intermediate holding member 109f, and has space 121F. The first optical element 104f and the second optical element 105f are positive lenses of a plastic molding type. The intermediate holding member 109f holds the first optical element 104f and the second optical element 105f. The space 121F is a space which is surrounded with the first optical element 104f and the second optical element 105f, both including the effective optical surfaces and the intermediate holding member 109f. Further, air duct 123F is an air duct wherein the section of air duct 123F is formed to be in the straight shape on the second optical element 105f side, and under the condition that the optical unit 102F is integrated in holding member 103F, air in the space 121F is communicated with the outside air 108. Incidentally, the air duct can also be provided at the first optical element 104f side.

The optical device 101F holds the optical unit 102F without blocking the air duct 123F formed on the optical unit 102F. The holding member 103F holds the optical unit 102F.

(The Embodiment of 2-7)

Drawings include a sectional side view and a bottom surface view both showing the structure of primary portions of an optical unit of the embodiment. Optical unit 102G is composed of first optical element 104G and second optical element 105G.

The first optical element 104G is a flat optical element having two effective optical surfaces 4a, and it is represented by, for example, a dichroic filter made of glass, a hologram element made of glass or plastic, a polarizing plate, a wavelength plate and a liquid crystal phase correcting plate. Outside the effective optical surface, there is provided touching surface 104f that touches the second optical element 105G.

The second optical element 105G has two effective optical surfaces 105a, flange 105b protruding in the direction perpendicular to optical axis Z and touching surface 105f that touches the first optical element 104G. The second optical element 105G is a plastic-molded positive lens.

Touching surface 104f representing a portion which is outside the effective optical surface 104a of the first optical element 104G and touching surface 105f of the second optical element 105G are in contact with each other, and they are fixed by adhesive agents 110.

Space 121G is a space surrounded by effective optical surface 4 a of the first optical element 104G and by effective optical surface 105a of the second optical element 105G. Gas channel 123G is provided in the vicinity of the touching portions of the first optical element 104G and the second optical element 105G, and it is a channel through which air representing gas in space 121A is communicated with the open air. To be concrete, a groove is provided on a part of a flange section of the second optical element 105G, and this groove can be made in the course of molding, because the second optical element is a plastic-molded part.

The optical unit 102G is incorporated in an optical apparatus by an unillustrated holding member that holds the optical unit 102G, without blocking the gas channel 123G.

With regard to the optical apparatus and optical unit 102G, deterioration of surface accuracy of an effective optical surface caused by expansion or contraction of air that arises from a change of ambient temperature and dew condensation arising from a fall of temperature are hardly caused owing to the foregoing, because air in space 121G is communicated with the open air through the gas channel 123G. Because of no fitting section in the present embodiment, an optical apparatus can be made small. Further, the structure suitable for integration of optical apparatus has been attained by the unitized positive lens and flat optical element.

(The Embodiment of 2-8)

Drawings include a sectional side view and a bottom surface view both showing the structure of primary portions of an optical unit of the embodiment. Optical unit 102H is composed of first optical element 104H and second optical element 105H.

The first optical element 104H has two effective optical surfaces 104a, flange 104b protruding in the direction perpendicular to optical axis Z and touching surface 104f that touches the second optical element 105H. The first optical element 104H is a plastic-molded positive lens.

The second optical element 105H has two effective optical surfaces 105a, flange 105b protruding in the direction perpendicular to optical axis Z and touching surface 105f that touches the first optical element 104H. The second optical element 105H is a plastic-molded positive lens.

Touching surface 104f of the first optical element 104H and touching surface 105f of the second optical element 105H are in contact with each other and are fixed with adhesive agents 110 between.

Space 121H is a space surrounded by effective optical surface 104a of the first optical element 104H and by effective optical surface 105a of the second optical element 105H. Gas channel 123H is provided in the vicinity of the touching portions of the first optical element 104H and the second optical element 105H, and it is a channel through which air representing gas in space 121H is communicated with the open air. To be concrete, a groove is provided on a part of a flange section of the second optical element 105H, and this groove can be made in the course of molding, because the second optical element is a plastic-molded part.

The optical unit 102H is incorporated in an optical apparatus by an unillustrated holding member that holds the optical unit 102H, without blocking the gas channel 123H.

With regard to the optical apparatus and optical unit 102H, deterioration of surface accuracy of an effective optical surface caused by expansion or contraction of air that arises from a change of ambient temperature and dew condensation arising from a fall of temperature are hardly caused owing to the foregoing, because air in space 121H is communicated with the open air through the gas channel 123H.

Because of no fitting section in the present embodiment, an optical apparatus can be made small. Further, the structure suitable for integration of optical apparatus has been attained by two lamination-layered and unitized positive lenses.

With the foregoing as a background, a decline of the surface accuracy of the effective optical surface caused by expansion or contraction of air due to a change of an ambient temperature and dew condensation due to a temperature fall hardly occur in the optical device 101F and the optical unit 102F.

Incidentally, though one set of the air duct is provided on each of the embodiments, the invention is not limited to this, and two or more air ducts, for example, may also be provided.

The following effects can be obtained by the aforesaid constructions. It is possible to provide the optical unit and the optical device in which a decline of the surface accuracy of the effective optical surface of the optical element and dew condensation hardly occur, even when there exists the space which is surrounded with the first optical element and the second optical element. Further, it is possible to provide the optical unit and the optical device in which a decline of the surface accuracy of the effective optical surface of the optical element and dew condensation hardly occur, even when there exists the space which is surrounded with the first optical element, the second optical element and the intermediate holding member.

An optical unit of the embodiment attaining the third object of the invention and an optical apparatus having therein the optical unit will be explained as follows, referring to the drawings.

(The Embodiment of 3-1)

Figure 12:
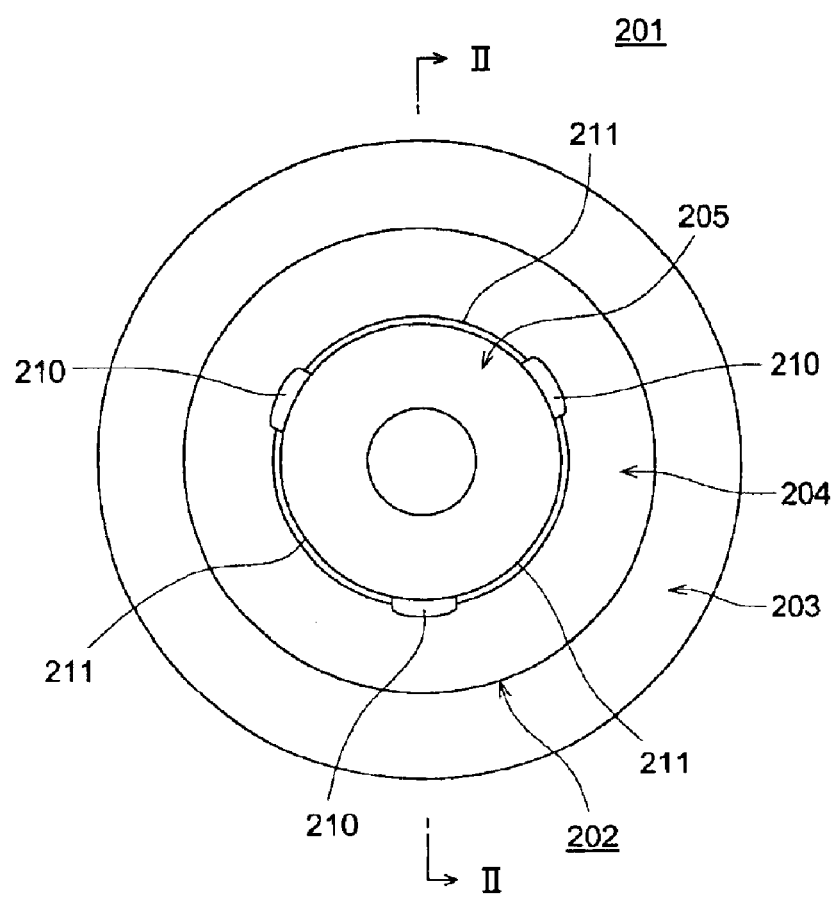
FIG. 12 is a rear elevation showing the structure of primary portions of an optical apparatus in the embodiment attaining the third object.
Figure 13:
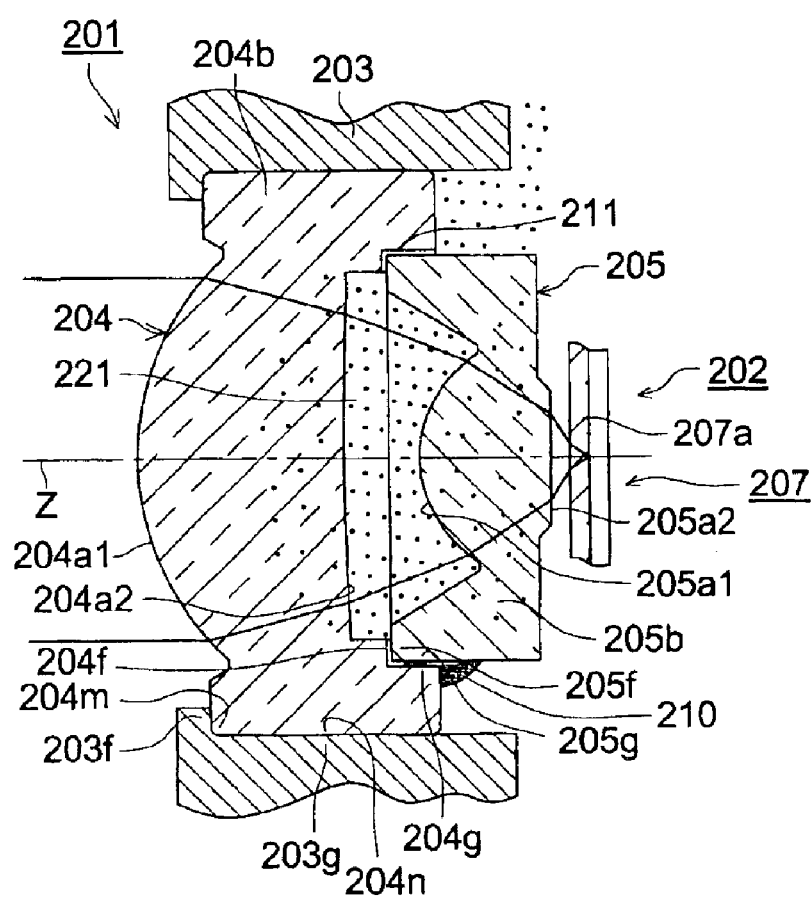
FIG. 13 is a sectional view taken on line II—II in FIG. 12.
Figure 14:
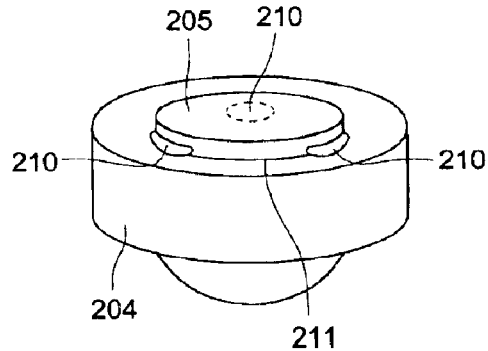
FIGS. 14(a) to 14(c) each is a perspective view of an optical unit.
Figure 14:
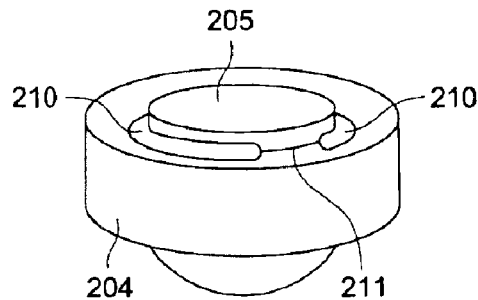
Figure 14:
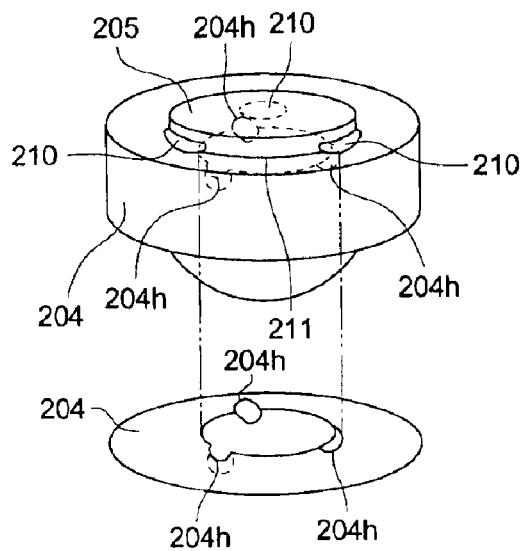

FIG. 12 is a rear elevation showing the structure of primary portions of an optical apparatus, FIG. 13 is a sectional view taken on line II—II in FIG. 12 and FIG. 14 is a perspective view of an optical unit.

Optical apparatus 201 is an optical apparatus for optical pickup having therein optical unit 202, and the optical apparatus 201 is composed of an unillustrated laser light source, optical unit 202 and holding member 203. Incidentally, the numeral 207 represents an optical disc and 207a represents a transparent protective layer for the optical disc.

The optical unit 202 is composed of first optical element 204 and second optical element 205. The first optical element 204 has therein two optical functional surfaces 204a1 and 204a2, flange section 204b protruding in the direction perpendicular to optical axis Z, touching surface 204f for second optical element 205, fitting section 204g for the second optical element, touching surface 204m for holding member 3 and fitting section 204n for holding member 203. The first optical element 204 is a plastic-molded positive lens.

The second optical element 205 has therein two optical functional surfaces 205a1 and 205a2, flange section 205b protruding in the direction perpendicular to optical axis Z, touching surface 205f for first optical element 204 and fitting section 205g for the first optical element 204. The second optical element 205 is a plastic-molded positive lens.

In the optical unit 202, the first optical element 204 and the second optical element 205 are combined so that clearance 221 may be formed between optical functional surfaces 204a2 and 205a1, and the optical unit 202 is held by holding member 203. The holding member 203 has fitting section 203g for the optical unit 202 and touching surface 203f for the optical unit 202, and holds the optical unit 202.

The first optical element 204 and the second optical element 205 are engaged each other with flange section 204b and flange section 205b both fitting each other on their almost all circumferences, and adhesive agents 10 are applied on prescribed portions on the fitting sections 204g and 205g, while, areas 11 where no adhesive agents are applied are provided on each of fitting sections 204g and 205g. It is preferable that the adhesive agents 210 are, for example, synthetic resin adhesive agents of a modified epoxy resin type or a modified acrylate resin type.

There is applied adhesive agent 210 on a prescribed portion of each of fitting sections 204g and 205g respectively of flange sections 204b and 205b respectively for the first optical element 204 and the second optical element 205, which makes it possible to combine the optical elements accurately. In addition to that, clearance 221 formed between optical functional surfaces 204a2 and 205a1 respectively of the first optical element 204 and the second optical element 205 is made not to be airtight by area 211 where adhesive agent 210 is not applied among fitting sections 204g and 205g. Since air in the clearance 221 is communicated with the open air through area 211 where adhesive agent 210 is not applied as stated above, air-permeability in the clearance 221 between optical functional surfaces 204a2 and 205a1 of the optical elements is secured, and thereby, there is hardly caused deterioration of surface accuracy of the optical functional surface resulting from expansion or contraction of air that arises from a change of ambient temperature. Further, even when ambient temperatures are changed, vapor is condensed into a dewdrop in clearance 221 between optical functional surfaces 204a2 and 205a1 of the optical elements, and it is prevented that vapor sticks to the surface of each of the optical functional surfaces 204a2 and 205a1 closer to the clearance 221.

Even when air flows to clearance 221 between optical functional surfaces 204a2 and 205a1 of the optical elements through area 211 where no adhesive agent 210 is applied serving as an air flow path as shown in FIG. 13, and an ambient temperature is changed accordingly, vapor is condensed into a dewdrop more firmly in clearance 221 between optical functional surfaces 204a2 and 205a1 of the optical elements, thus, it is prevented that vapor sticks to the obverse of each of optical functional surfaces 204a2 and 205a1 closer to the clearance 221.

The number of portions where adhesive agents 210 are applied is two or more, and each of FIGS. 14(a) and 14(c) shows an embodiment wherein adhesive agents 210 are applied on three portions, and FIG. 14(b) shows an embodiment wherein adhesive agents 210 are applied on two portions. With regard to adhesive agent 210, when its viscosity is high, it can be applied on plural points as shown in FIGS. 14(a) and 14(b), but when its viscosity is low, it flows out. Therefore, recessed portion 204h is formed on fitting section 204g of the first optical element 204 so that the recessed portion 204h may serve as a pool for the adhesive agent 210 whose viscosity is low, and area 211 where no adhesive agent 210 is applied may be secured.

The number of portions where adhesive agents 210 are applied is two or more as stated above, and thereby, optical elements are cemented with each other firmly, and the optical elements can be combined highly accurately with less tilt and less shift of optical axis Z.

When portions where adhesive agents 210 are applied are provided at almost regular intervals on each of flange sections 204b and 205b respectively of first optical element 204 and second optical element 205, optical elements are cemented with each other firmly and evenly, and the optical elements can be combined more accurately with less tilt and less shift of optical axis Z.

Further, water vapor transmission ratio of hardened adhesive agent 210 is 10 $g/m^2 \cdot 24$ h–60 $g/m^2 \cdot 24$ h, and it preferably is about 40 $g/m^2 \cdot 24h$. In this case, the water vapor transmission ratio is represented by an amount of vapor in gram (g) transmitted through a sheet having an area of 1 $m^2$ under a certain condition for 24 hours when water transmits vapor. By regulating the water vapor transmission ratio of hardened adhesive agent 210 as stated above, vapor generated in clearance 221 formed between optical functional surfaces 204a2 and 205a1 of the optical elements is transmitted through adhesive agent 210 and leaks to the outside and it is possible to prevent that vapor generated in the clearance formed between optical functional surfaces 204a2 and 205a1 of the optical elements is condensed into a dewdrop.

Coefficient of water absorption of hardened adhesive agent 210 is 0.1%–10%, and it preferably is about 2%. In this case, the coefficient of water absorption is an evaluation scale for the property of substance to absorb water, and it is indicated by a percentage wherein an increment in terms of mass is divided by original mass when substance is soaked in distilled water for a certain period of time at a certain humidity, or by an increment in terms of mass for the original surface area, or by mass of an increment for a mere stipulated test piece. By stipulating the coefficient of water absorption of hardened adhesive agent 210, vapor generated in a clearance formed between optical functional surfaces 204a2 and 205a1 of the optical elements is absorbed in adhesive agents 210, and it is possible to prevent that vapor generated in clearance 221 formed between optical functional surfaces 204a2 and 205a1 of the optical elements is condensed into a dewdrop.

On the other hand, adhesive strength of hardened adhesive agent 210 is 40 $Kgf/cm^2$–300 $Kgf/cm^2$, and it preferably is about 130 $Kgf/cm^2$. In this case, the adhesive strength is represented by bonding strength between two cemented surfaces, and it is expressed by tension shear strength, compression shear strength or by exfoliation strength, and in this case, it is expressed by tension shear strength ($Kgf/cm^2$). By stipulating the adhesive strength of hardened adhesive agent 210, optical elements are cemented with each other firmly, and the optical elements can be combined highly accurately with less tilt and less shift of optical axis.

(The Embodiment of 3-2)

Figure 15:
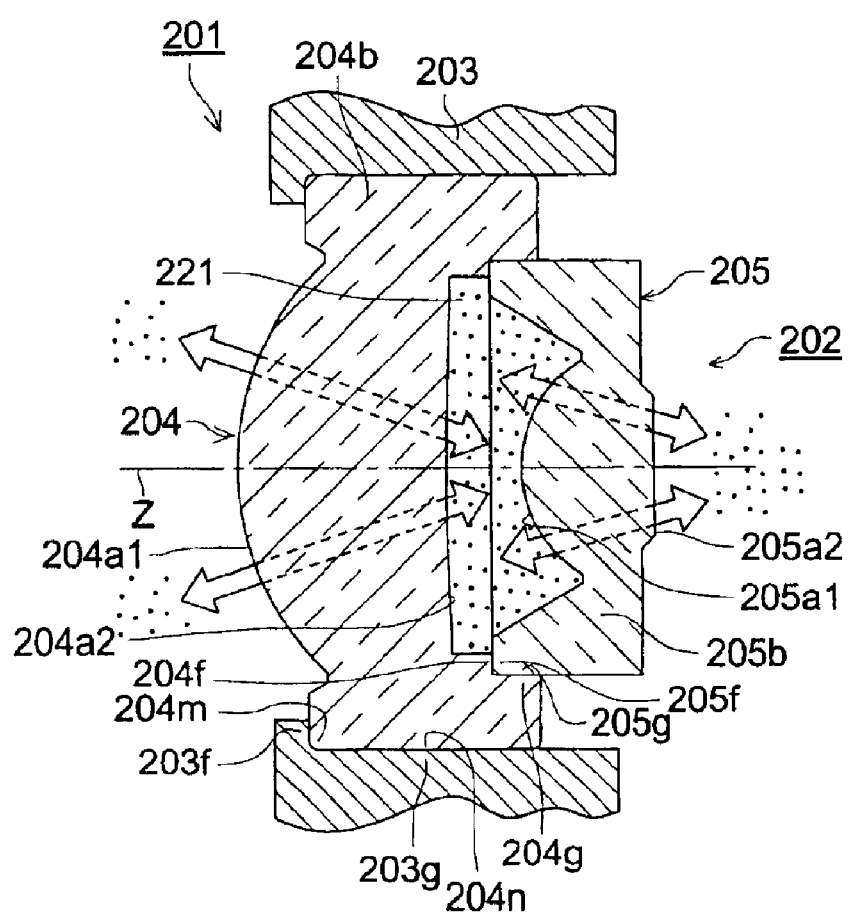
FIG. 15 is a sectional view showing the structure of primary portions of an optical apparatus in another embodiment.

Parts and portions in the present embodiment which are the same as those in the first embodiment are given the same symbols and explanation for them will be omitted partly. FIG. 15 is a sectional view showing the structure of primary portions of an optical apparatus.

In the present embodiment, first optical element 204 and second optical element 205 are engaged each other with flange section 204b and flange section 205b both fitting each other on their almost all circumferences, and fitting sections 204g and 205g are in close contact with each other, while, water vapor transmission ratio of the first and second optical elements is 1 g/m²·24 h–40 g/m²·24 h, and it preferably is about 3 g/m²·24 h.

The first optical element 204 and the second optical element 205 can be combined with each other highly accurately with their fitting sections 204g and 205g being in close contact each other, and by stipulating the water vapor transmission ratio of the first optical element 204 and the second optical element 205, vapor is transmitted through the first optical element 204 and the second optical element 205 to leak to the outside, thus, it is possible to prevent that vapor generated in clearance 221 between optical functional surfaces 204a2 and 205a1 of the optical elements is condensed into a dewdrop.

Figure 16:
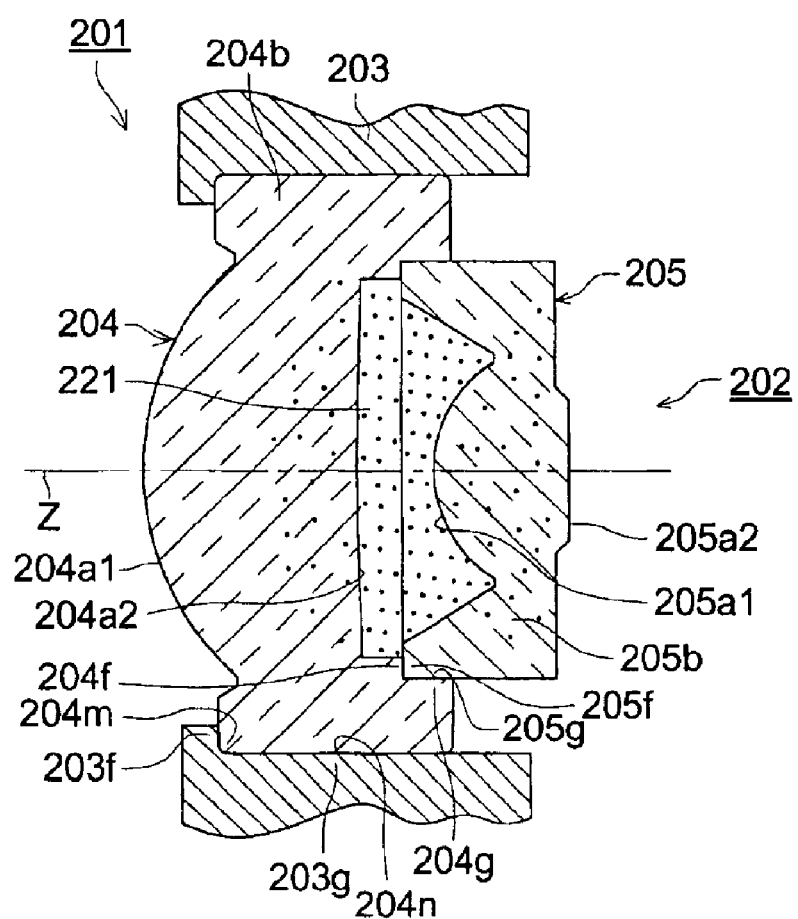
FIG. 16 is a sectional view showing the structure of primary portions of an optical apparatus in another embodiment.

FIG. 16 is a sectional view showing the structure of primary portions of an optical apparatus in another embodiment.

In the present embodiment, first optical element 204 and second optical element 205 are engaged each other with flange section 204b and flange section 205b both fitting each other on their almost all circumferences, and fitting sections 204g and 205g are in close contact with each other, while, coefficient of water absorption of the first optical element 204 and the second optical element 205 is 0.01%–2%, and it preferably is about 0.5%.

The first optical element 204 and the second optical element 205 can be combined with each other highly accurately with their fitting sections 204g and 205g being in close contact each other, and by stipulating the coefficient of water absorption of the first optical element 204 and the second optical element 205, vapor is absorbed in the first optical element 204 and the second optical element 205, thus, it is possible to prevent that vapor generated in clearance 221 between optical functional surfaces 204a2 and 205a1 of the optical elements is condensed into a dewdrop.

(The Embodiment of 3—3)

Figure 17:
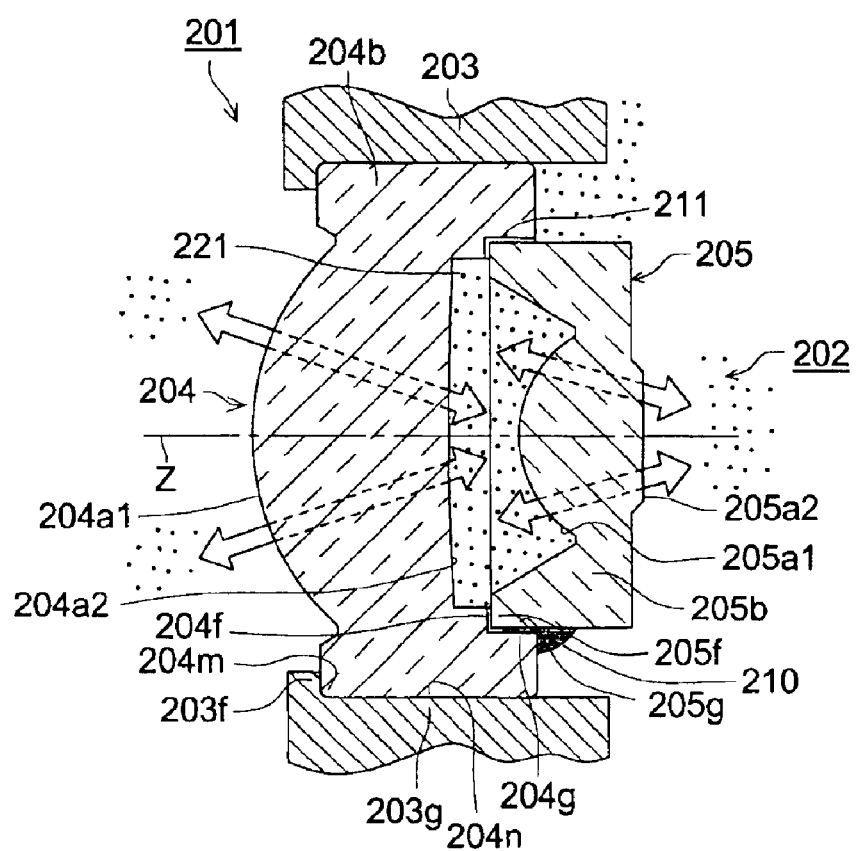
FIG. 17 is a sectional view showing the structure of primary portions of an optical apparatus in another embodiment.

Parts and portions in the present embodiment which are the same as those in the first embodiment and the second embodiment are given the same symbols and explanation for them will be omitted partly. FIG. 17 is a sectional view showing the structure of primary portions of an optical apparatus.

In the present embodiment, first optical element 204 and second optical element 205 are engaged each other with flange section 204b and flange section 205b both fitting each other on their almost all circumferences, in the same way as in the first embodiment, and adhesive agents 210 are applied on the prescribed portions of fitting sections 204g and 205g, while, area 211 where no adhesive agent 10 is applied is provided on fitting sections 204g and 205g. In addition, water vapor transmission ratio of the first and second optical elements is 1 g/m²·24 h–40 g/m²·24 h, and it preferably is about 3 g/m²·24 h.

The first optical element 204 and the second optical element 205 can be combined with each other highly accurately when adhesive agents 210 are applied on prescribed portions on fitting sections 204g and 205g respectively of the flange sections 204b and 205b. Moreover, vapor generated in clearance 221 between optical functional surfaces 204a2 and 205a1 of the optical elements leaks to the outside through area 211 where no adhesive agent 10 is applied on fitting sections 204g and 205g, and water vapor transmission ratio of the first and second optical elements is 1 g/m²·24 h–40 g/m²·24 h, and vapor is transmitted through the first optical element 204 and the second optical element 205 and leaks to the outside, therefore, it is possible to prevent that vapor is condensed into a dewdrop.

Figure 18:
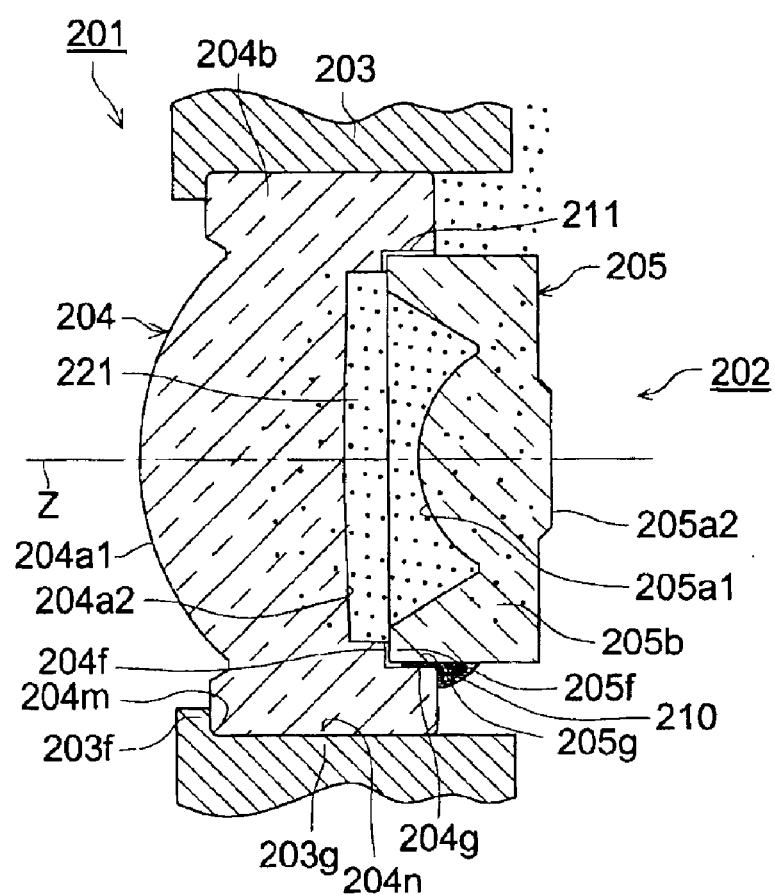
FIG. 18 is a sectional view showing the structure of primary portions of an optical apparatus in another embodiment.

FIG. 18 is a sectional view showing the structure of primary portions of an optical apparatus in another embodiment.

In the present embodiment, first optical element 204 and second optical element 205 are engaged each other with flange section 204b and flange section 205b both fitting each other on their almost all circumferences, and fitting sections 204g and 205g are in close contact with each other, while, coefficient of water absorption of the first and second optical elements is 0.01%–2%, and it preferably is about 0.5%.

The first optical element 204 and the second optical element 205 can be combined with each other highly accurately when adhesive agents 210 are applied on prescribed portions on fitting sections 204g and 205g respectively of the flange sections 204b and 205b. Moreover, vapor generated in clearance 221 between optical functional surfaces 204a2 and 205a1 of the optical elements leaks to the outside through area 211 where no adhesive agent 10 is applied on fitting sections 204g and 205g, and coefficient of water absorption of the first and second optical elements is 0.01%–2%, and vapor generated in clearance 21 between optical functional surfaces 204a2 and 205a1 of the optical elements is absorbed by the first optical element 204 and the second optical element 205, thus it is possible to prevent that vapor generated in clearance 21 between optical functional surfaces 204a2 and 205a1 of the optical elements is condensed into a dewdrop.

(The Embodiment of 3-4)

Figure 19:
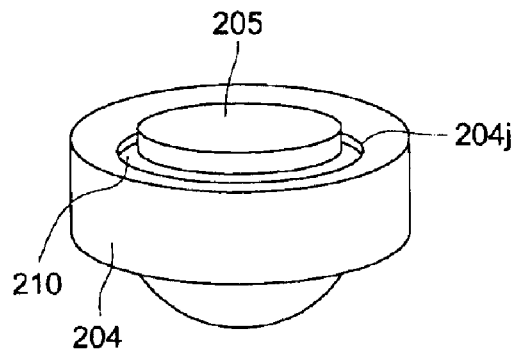
FIGS. 19(a) to 19(c) each is a perspective view of an optical unit in another embodiment.
Figure 19:
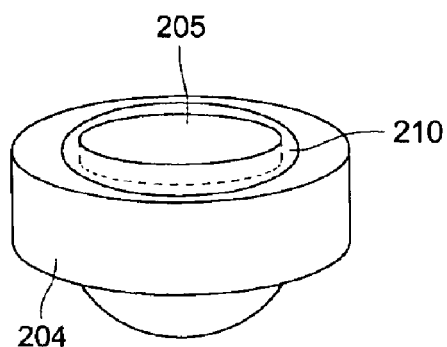
Figure 19:
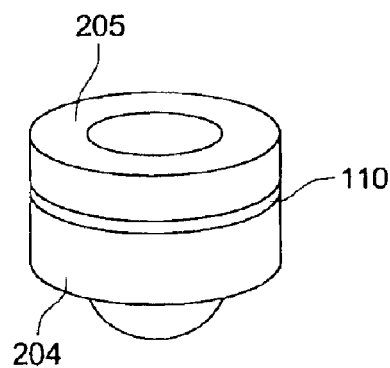

Parts and portions in the present embodiment which are the same as those in the embodiment of 3-1—the embodiment of 3—3 are given the same symbols and explanation for them will be omitted partly. FIG. 19 is a perspective view of an optical unit.

In the present embodiment, first optical element 204 and second optical element 205 are engaged each other with flange section 204b and flange section 205b both fitting each other on their almost all circumferences, in the same way as in the first embodiment, and adhesive agents 210 are applied on almost all circumferences of fitting sections 204g and 205g. In FIG. 17(a), pool groove 204j for adhesive agents is formed on the first optical element 204 so that adhesive agents 210 may be applied in the pool groove, in FIG. 17(b), adhesive agents 210 are applied in a way that they surround the second optical element 205, and in FIG. 17(c), the first optical element 204 and the second optical element 205 are made to be almost the same in terms of a diameter, and adhesive agents 210 are applied.

As stated above, the water vapor transmission ratio of hardened adhesive agents applied on almost all circumference of fitting sections 204g and 205g is 10 g/m²·24 h–60 g/m²·24 h, and it preferably is about 40 g/m²·24h, and vapor generated in a clearance between optical functional surfaces of optical elements is transmitted through adhesive agents and leaks to the outside, thus, it is possible to prevent that vapor is condensed into a dewdrop.

Further, the coefficient of water absorption of hardened adhesive agents applied on almost all circumference of fitting sections 204g and 205g is 0.1%–10%, and it preferably is about 2%, and vapor generated in a clearance between optical functional surfaces of optical elements is absorbed in adhesive agents, thus, it is possible to prevent that vapor generated in a clearance between optical functional surfaces of the optical elements is condensed into a dewdrop.

As described above, in the inventions described in Structures (3-1)–(3-14), even when a clearance is present between optical functional surfaces of optical elements, deterioration of surface accuracy of the optical functional surface of the optical element and dew condensation are hardly caused when air permeability in the clearance between the optical functional surfaces of the optical elements is secured.

What is claimed is:

1. An objective lens for use in an optical pickup apparatus, comprising:
    a first lens molded with a plastic and having an optically functional section, a flange section provided around the periphery of the optically functional section, and a first contacting section provided on the flange section; and
    a second lens molded with a plastic, located opposite to the first lens and having an optically functional section, a flange section provided around the periphery of the optically functional section, and a second contacting section provided on the flange section,
    wherein the first lens and the second lens are jointed in such a way that the first contacting section and the second contacting section are brought in contact with each other,
    wherein the first lens has a first surface and a second surface and the second lens has a third surface and a fourth surface as an optically functional surface, and wherein when the objective lens has an object side and an image side, the first surface, the second surface, the third surface and the fourth surface are arranged in this order from the object side and the first surface and the third surface are a convex surface respectively, and
    wherein an outer diameter of the second lens is smaller than that of the first lens.

2. The objective lens of claim 1, wherein the first contacting section is provided on a flange section provided around the periphery of the second surface and is protruded toward the image side in the optical axis direction from a position of the second surface and the second contacting section is provided on a flange section provided around the periphery of the third surface and is protruded toward the object side in the optical axis direction.

3. The objective lens of claim 2, wherein the first contacting section and the second contacting section are brought in contact with each other so that the first lens holds the second lens.

4. The objective lens of claim 1, wherein the fourth surface is a flat surface.

5. The objective lens of claim 1, wherein a concave portion made hollow toward the object side from a position where the fourth surface is located closest to the object is provided on the flange section provided around the periphery of the optically functional section.

6. The objective lens of claim 1, wherein the first contacting section and the second contacting section are brought in contact with each other so that relatively positioning in the optical axis direction between the first lens and the second lens is determined.

7. The objective lens of claim 6, wherein the first contacting section has a first perpendicular surface perpendicular to the optical axis and the second contacting section has a second perpendicular surface perpendicular to the optical axis and wherein the first perpendicular surface and the second perpendicular surface are brought in contact with each other so that relatively positioning in the optical axis direction between the first lens and the second lens is determined.

8. The objective lens of claim 1, wherein the first contacting section and the second contacting section are brought in contact with each other so that relatively positioning in a direction perpendicular to the optical axis between the first lens and the second lens is determined.

9. The objective lens of claim 8, wherein the first contacting section has a first parallel surface parallel to the optical axis and the second contacting surface has a second parallel surface parallel to the optical axis and wherein the first parallel surface and the second parallel surface are brought in contact with each other so that relatively positioning in the direction perpendicular to the optical axis between the first lens and the second lens is determined.

10. The objective lens of claim 1, wherein the first contacting section and the second contacting section are brought in contact with each other so that relatively positioning in the optical direction and in a direction perpendicular to the optical axis between the first lens and the second lens is determined.

11. The objective lens of claim 10, wherein the first contacting section has a first perpendicular surface perpendicular to the optical axis and a first parallel surface parallel to the optical axis and the second contacting section has a second perpendicular surface perpendicular to the optical axis and a second parallel surface parallel to the optical axis and wherein the first surface perpendicular surface and the second perpendicular surface are brought in contact with each other so that relatively positioning in the optical axis direction between the first lens and the second lens is determined, and the first parallel surface and the second parallel surface are brought in contact with each other so that relatively positioning in the direction perpendicular to the optical axis between the first lens and the second lens is determined.

12. The objective lens of claim 1, wherein the first contacting section and the second contacting section are brought in contact with each other so that the first lens and the second lens are engaged tightly with each other with no clearance between the first lens and the second lens.

13. The objective lens of claim 1, wherein the first contacting section and the second contacting section are brought in contact with each other so that the first lens and the second lens are engaged with each other with a clearance between the first lens and the second lens.

14. The objective lens of claim 1, wherein after the first contacting section and the second contacting section are brought in contact with each other, the first lens and the second lens are fixed.

15. The objective lens of claim 1, wherein the optically functional section of the first lens and the optically functional section of the second lens are located opposite to each other and are spaced from each other.

16. The objective lens of claim 1, wherein the diameter of the optically functional section of a lens located closest to the image side is 40% or less of the outer diameter of the lens located closest to the image side.

17. The objective lens of claim 1, wherein the first contacting section and the second contacting section are provided in a ring-shaped form on the flange section around the optically functional section.

18. The objective lens of claim 1, wherein a first image side-flat surface is provided in a direction perpendicular to the optical axis at the image side on the flange section outer more than the first contacting section and a second image side-flat surface is provided in a direction perpendicular to the optical axis at the image side on the flange section outer more than the optically functional section of the second lens.

19. The objective lens of claim 18, wherein the first image side-flat surface and the second image side-flat surface are a mirror surface respectively.

20. The objective lens of claim 1, further comprising:
a gas flow passage to allow gas to flow between a space enclosed by the optically functional section of the first lens and the optically functional section of the second lens and outside of the object lens.

21. The objective lens of claim 20, wherein the gas flow passage is provided in the vicinity of a position where the first lens and the second lens are jointed.

22. The objective lens of claim 20, wherein the gas flow passage is provided on one of the first lens and the second lens.

23. The objective lens of claim 1, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive.

24. The objective lens of claim 1, wherein the flange section of the first lens and the flange section of the second lens are fitted in close contact with each other almost all around the flange section and at least one of the first lens and the second lens has a water vapor transmission ratio of 1 g/m²·24 h to 60 g/m²·24 h.

25. The objective lens of claim 23, wherein the flange section of the first lens and the flange section of the second lens are fitted in close contact with each other almost all around the flange section and at least one of the first lens and the second lens has a coefficient of water absorption of the adhesive after hardened is 0.01% to 2%.

26. The objective lens of claim 1, wherein a numerical aperture of the objective lens is 0.8 to 0.9.

27. An objective lens for use in an optical pickup apparatus, comprising:
a first lens molded with a plastic and having an optically functional section, a flange section provided around the periphery of the optically functional section, and a first contacting section provided on the flange section; and
a second lens molded with a plastic, located opposite to the first lens and having an optically functional section, a flange section provided around the periphery of the optically functional section, and a second contacting section provided on the flange section,
wherein the first lens and the second lens are jointed in such a way that the first contacting section and the second contacting section are brought in contact with each other,
wherein the first lens has a first surface and a second surface and the second lens has a third surface and a fourth surface as an optically functional surface, and wherein when the objective lens has an object side and an image side, the first surface, the second surface, the third surface and the fourth surface are arranged in this order from the object side and the first surface and the third surface are a convex surface respectively, and
wherein the fourth surface is a flat surface.

28. An objective lens for use in an optical pickup apparatus, comprising:
a first lens molded with a plastic and having an optically functional section, a flange section provided around the periphery of the optically functional section, and a first contacting section provided on the flange section; and
a second lens molded with a plastic, located opposite to the first lens and having an optically functional section, a flange section provided around the periphery of the optically functional section, and a second contacting section provided on the flange section,
wherein the first lens and the second lens are jointed in such a way that the first contacting section and the second contacting section are brought in contact with each other,
wherein the first lens has a first surface and a second surface and the second lens has a third surface and a fourth surface as an optically functional surface, and wherein when the objective lens has an object side and an image side, the first surface, the second surface, the third surface and the fourth surface are arranged in this order from the object side and the first surface and the third surface are a convex surface respectively, and
wherein a concave portion made hollow toward the object side from a position where the fourth surface is located closest to the object is provided on the flange section provided around the periphery of the optically functional section.

29. An objective lens for use in an optical pickup apparatus, comprising:
a first lens molded with a plastic and having an optically functional section, a flange section provided around the periphery of the optically functional section, and a first contacting section provided on the flange section; and
a second lens molded with a plastic, located opposite to the first lens and having an optically functional section, a flange section provided around the periphery of the optically functional section, and a second contacting section provided on the flange section,
wherein the first lens and the second lens are jointed in such a way that the first contacting section and the second contacting section are brought in contact with each other, and
wherein the first contacting surface has a first parallel surface parallel to the optical axis and the second contacting surface has a second parallel surface parallel to the optical axis and wherein the first parallel surface and the second parallel surface are brought in contact with each other so that relatively positioning in the direction perpendicular to the optical axis between the first lens and the second lens is determined.

30. An objective lens for use in an optical pickup apparatus, comprising:
a first lens molded with a plastic and having an optically functional section, a flange section provided around the periphery of the optically functional section, and a first contacting section provided on the flange section; and
a second lens molded with a plastic, located opposite to the first lens and having an optically functional section, a flange section provided around the periphery of the optically functional section, and a second contacting section provided on the flange section,
wherein the first lens and the second lens are jointed in such a way that the first contacting section and the second contacting section are brought in contact with each other, and
wherein the first contacting section has a first perpendicular surface perpendicular to the optical axis and a first parallel surface parallel to the optical axis and the second contacting section has a second perpendicular surface perpendicular to the optical axis and a second parallel surface parallel to the optical axis and wherein the first perpendicular surface and the second perpendicular surface are brought in contact with each other so that relatively positioning in the optical axis direction between the first lens and the second lens is determined, and the first parallel surface and the second parallel surface are brought in contact with each other so that relatively positioning in the direction perpendicular to the optical axis between the first lens and the second lens is determined.

31. An objective lens for use in an optical pickup apparatus, comprising:

a first lens molded with a plastic and having an optically functional section, a flange section provided around the periphery of the optically functional section, and a first contacting section provided on the flange section; and a second lens molded with a plastic, located opposite to the first lens and having an optically functional section, a flange section provided around the periphery of the optically functional section, and a second contacting section provided on the flange section, wherein the first lens and the second lens are jointed in such a way that the first contacting section and the second contacting section are brought in contact with each other, and wherein the diameter of the optically functional section of a lens located closest to the image side is 40% or less of the outer diameter of the lens located closest to the image side.

32. An objective lens for use in an optical pickup apparatus, comprising:

a first lens molded with a plastic and having an optically functional section, a flange section provided around the periphery of the optically functional section, and a first contacting section provided on the flange section; and a second lens molded with a plastic, located opposite to the first lens and having an optically functional section, a flange section provided around the periphery of the optically functional section, and a second contacting section provided on the flange section, wherein the first lens and the second lens are jointed in such a way that the first contacting section and the second contacting section are brought in contact with each other, and wherein a first image side-flat surface is provided in a direction perpendicular to the optical axis at the image side on the flange section outer more than the first contacting section and a second image side-flat surface is provided in a direction perpendicular to the optical axis at the image side on the flange section outer more than the optically functional section of the second lens.

33. An objective lens for use in an optical pickup apparatus, comprising:

a first lens molded with a plastic and having an optically functional section, a flange section provided around the periphery of the optically functional section, and a first contacting section provided on the flange section; and a second lens molded with a plastic, located opposite to the first lens and having an optically functional section, a flange section provided around the periphery of the optically functional section, and a second contacting section provided on the flange section, wherein the first lens and the second lens are jointed in such a way that the first contacting section and the second contacting section are brought in contact with each other, and wherein the first contacting section has a first slope surface slanted to the optical axis and the second contacting section has a second slope surface slanted to the optical axis and wherein the first slope surface and the second slope surface are brought in contact with each other so that relatively positioning in the optical axis direction and in the direction perpendicular to the optical axis between the first lens and the second lens is determined.

34. An objective lens for use in an optical pickup apparatus, comprising:

a first lens molded with a plastic and having an optically functional section, a flange section provided around the periphery of the optically functional section, and a first contacting section provided on the flange section; and a second lens molded with a plastic, located opposite to the first lens and having an optically functional section, a flange section provided around the periphery of the optically functional section, and a second contacting section provided on the flange section, wherein the first lens and the second lens are jointed in such a way that the first contacting section and the second contacting section are brought in contact with each other, and a gas flow passage to allow gas to flow between a space enclosed by the optically functional section of the first lens and the optically functional section of the second lens and outside of the object lens.

35. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein the portion not applied with the adhesive is used as the gas flow passage.

36. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein the portion not applied with the adhesive is provided at least two positions on the fitted section.

37. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein the predetermine portions applied with the adhesive are arranged with an equal interval between the predetermine portions.

38. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein a water vapor transmission ratio of the adhesive after hardened is 10 g/m$^2$·24 h to 60 g/m$^2$·24 h.

39. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein a coefficient of water absorption of the adhesive after hardened is 0.1% to 10%.

40. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein an adhesion strength of the adhesive after hardened is 40 Kgf/cm$^2$ to 300 Kgf/cm$^2$.

41. The objective lens of claim 34, wherein at least one of the first lens and the second lens has a water vapor transmission ratio of 1 g/m$^2$·24 h to 60 g/m$^2$·24 h.

42. The objective lens of claim 34, wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive, and wherein at least one of the first lens and the second lens has a coefficient of water absorption of the adhesive after hardened of 0.01% to 2%.

43. An objective lens for use in an optical pickup apparatus, comprising:
- a first lens molded with a plastic and having an optically functional section, a flange section provided around the periphery of the optically functional section, and a first contacting section provided on the flange section; and
- a second lens molded with a plastic, located opposite to the first lens and having an optically functional section, a flange section provided around the periphery of the optically functional section, and a second contacting section provided on the flange section,
- wherein the first lens and the second lens are jointed in such a way that the first contacting section and the second contacting section are brought in contact with each other, and
- wherein the flange section of the first lens and the flange section of the second lens are fitted with each other almost all around the flange section and predetermined portions on the fitted section between the flange section of the first lens and the flange section of the second lens are applied with an adhesive and a portion on the fitted section is not applied with the adhesive.

44. An objective lens for use in an optical pickup apparatus, comprising:
- a first lens molded with a plastic and having an optically functional section, a flange section provided around the periphery of the optically functional section, and a first contacting section provided on the flange section; and
- a second lens molded with a plastic, located opposite to the first lens and having an optically functional section, a flange section provided around the periphery of the optically functional section, and a second contacting section provided on the flange section,
- wherein the first lens and the second lens are jointed in such a way that the first contacting section and the second contacting section are brought in contact with each other, and
- wherein the flange section of the first lens and the flange section of the second lens are fitted in close contact with each other almost all around the flange section and at least one of the first lens and the second lens has a water vapor transmission ratio of 1 g/m$^2$·24 h to 60 g/m$^2$·24 h.

45. An objective lens for use in an optical pickup apparatus, comprising:
- a first lens molded with a plastic and having an optically functional section, a flange section provided around the periphery of the optically functional section, and a first contacting section provided on the flange section; and
- a second lens molded with a plastic, located opposite to the first lens and having an optically functional section, a flange section provided around the periphery of the optically functional section, and a second contacting section provided on the flange section,
- wherein the first lens and the second lens are jointed in such a way that the first contacting section and the second contacting section are brought in contact with each other, and
- wherein the flange section of the first lens and the flange section of the second lens are fitted in close contact with each other almost all around the flange section and at least one of the first lens and the second lens has a coefficient of water absorption of the adhesive after hardened of 0.01% to 2%.

46. An objective lens for use in a optical pickup apparatus, comprising:
- a first lens having an optically functional section;
- a second lens having an optically functional section;
- an intermediate holding member to hold the first lens and the second lens in such a way that the first lens, the second lens and the intermediate holding member are constructed in a single body, and
- a gas flow passage to allow gas to flow between a space enclosed by the optically functional section of the first lens, the intermediate holding member and the optically functional section of the second lens and outside of the object lens.

47. The objective lens of claim 46, wherein the gas flow passage is provided in the vicinity of a position where the first lens, the intermediate holding member and the second lens are jointed.

48. The objective lens of claim 46, wherein the gas flow passage is provided on at least one of the first lens, the intermediate holding member and the second lens.

49. An optical unit for use in an optical device, comprising:
- a first optical element having an optically functional section and a first contacting section provided on a periphery of the optically functional section, and
- a second optical element having an optically functional section and a first contacting section provided on a periphery of the optically functional section;
- wherein the first optical element and the second optical element are jointed in such a way that the first contacting section and the second contacting section are brought in contact with each other and an enclosure space is provided between the first optical element and the second optical element, and
- wherein at least one of the first optical element and the second optical element is provided with an air flow passage to communicate between the enclosure space and the outside.

50. The optical unit of claim 49, wherein the first optical element is a flat plate-shaped optical element and the second optical element is a lens having a flange section provided around the optically functional section, and wherein the second contacting section is provided on the flange section and is fixed with the first contacting section with an adhesive.

51. The optical unit of claim 50, wherein the flat plate-shaped optical element is a hologram element, a wavelength plate, a polarizing plate and a phase correcting element.

52. An optical pickup apparatus, comprising:
 an objective lens comprising:
  a first lens molded with a plastic and having an optically functional section, a flange section provided around the periphery of the optically functional section, and a first contacting section provided on the flange section; and
  a second lens molded with a plastic, located opposite to the first lens and having an optically functional section, a flange section provided around the periphery of the optically functional section, and a second contacting section provided on the flange section,
 wherein the first lens and the second lens are jointed in such a way that the first contacting section and the second contacting section are brought in contact with each other, and
 wherein on the condition where the first contacting section and the second contacting section are brought in contact with each other so that relatively positioning in the optical axis direction between the first lens and the second lens is determined, when the second lens is shifted relatively to the first lens in a direction perpendicular to the optical axis in a clearance on a fitted section between the first lens and the second lens, a variance in wave front aberration on an image forming point is less than a value defined by a diffraction limiting function.

53. The optical pickup apparatus of claim 52, wherein optical pickup apparatus has a wave front aberration lower than the value defined by Marechal's criterion.

54. The optical pickup apparatus of claim 52, wherein the first lens is held by a lens frame driven by an actuator.

* * * * *

UNITED STATES PATENT AND TRADEMARK OFFICE
CERTIFICATE OF CORRECTION

PATENT NO. : 6,919,996 B2  Page 1 of 1
APPLICATION NO. : 10/642199
DATED : July 19, 2005
INVENTOR(S) : Kazuhiro Wada et al.

It is certified that error appears in the above-identified patent and that said Letters Patent is hereby corrected as shown below:

On the Title Page, Item (57), in the Abstract, line 3, before "flange section", insert --a--.

Column 32, line 6, "contacting surface" should read --contacting section--.

Column 32, line 23, "first surface perpendicular surface" should read --first perpendicular surface--.

Column 36, line 52, "predetermine" should read --predetermined--.

Column 36, line 54, "predetermine" should read --predetermined--.

Column 37, line 34, after "plastic", delete the comma.

Column 40, line 18, "Marechal's" should read --Maréchal's--.

Signed and Sealed this

Nineteenth Day of February, 2008

JON W. DUDAS
*Director of the United States Patent and Trademark Office*